United States Patent [19]
Cawlfield

[11] Patent Number: 5,519,605
[45] Date of Patent: May 21, 1996

[54] MODEL PREDICTIVE CONTROL APPARATUS AND METHOD

[75] Inventor: David W. Cawlfield, Cleveland, Tenn.

[73] Assignee: Olin Corporation, Stamford, Conn.

[21] Appl. No.: 328,100

[22] Filed: Oct. 24, 1994

[51] Int. Cl.[6] .................................................. G05B 13/04
[52] U.S. Cl. ..................... 364/151; 364/157; 364/165
[58] Field of Search ................................. 364/164, 165, 364/148, 149–151, 152, 157, 158, 176, 178; 318/561

[56] References Cited

U.S. PATENT DOCUMENTS

| | | | |
|---|---|---|---|
| 4,349,869 | 9/1982 | Prett et al. | 364/159 |
| 4,577,270 | 3/1986 | Sugano et al. | 364/151 |
| 4,616,308 | 10/1986 | Morshedi et al. | 364/159 |
| 4,663,703 | 5/1987 | Axelby et al. | 364/149 |
| 4,791,548 | 12/1988 | Yoshikawa et al. | 364/149 |
| 4,928,484 | 5/1990 | Peczkowski | 60/240 |
| 4,998,051 | 3/1991 | Ito | 364/150 X |
| 5,010,473 | 4/1991 | Jacobs | 364/150 |
| 5,091,843 | 2/1992 | Peczkowski | 364/150 |
| 5,144,549 | 9/1992 | Youcef-Toumi | 364/148 |
| 5,293,553 | 3/1994 | Dudek et al. | 364/431.04 |
| 5,301,101 | 4/1994 | MacArthur et al. | 364/156 |
| 5,343,209 | 8/1994 | Sennott et al. | 342/357 |
| 5,347,446 | 9/1994 | Iino et al. | 364/149 |
| 5,446,648 | 8/1995 | Abramovitch et al. | 364/148 |

OTHER PUBLICATIONS

"An Operator Control Theory Approach to the Design and Tuning of Constrained Model Predictive Controllers", E. Zafiriou and H. Chiou, *Paper 21e, 1989 Annual AIChE Meeting*, pp. 1–10, Nov. 5–10, 1989.

"Deterministic adaptive control based on Laguerre series representation", C. C. Zervos and G. A Dumont, *Int. J. Control*, 1988, vol. 48, No. 6, 2333–2359.

"Experience With The DMC Inverse For Identification", C. R. Cutler and F. H. Yocum, *Model–Based Control*, pp. 297–317, undated.

"Linear model predictive control of unstable processes", K. R. Muske and J. B. Rawlings, *J. Proc. Cont.*, vol. 3, No. 2, pp. 85–96, 1993.

"Model–Predictive Control: State of the Art", N. L. Ricker, *Model–Based Control*, pp. 271–296, undated.

"Model Predictive Control: The Good, the Bad, and the Ugly", M. Morari and J. H. Lee, *Model–Based Control*, pp. 419–444, undated.

"Nonlinear Model Predictive Control: A Tutorial And Survey", J. B. Rawlings, E. S. Meadows and K. R. Muske, undated.

"Optimal Solution Of Dynamic Matrix Control With Linear Programming Techniques (LDMC)", A. M. Morshedi, C. R. Cutler and T. A. Skrovanek, pp. 199–208, undated.

(List continued on next page.)

*Primary Examiner*—Joseph Ruggiero
*Attorney, Agent, or Firm*—Morgan & Finnegan

[57] ABSTRACT

A model predictive control apparatus and method for controlling the operation of a process having a process input signal and a process output signal, which includes determining a predicted process output signal at a future steady state condition according to a process model, determining a steady state error signal according to the difference between the predicted process output signal and a desired set point signal, and determining a set of future process input change signals required to correct for the estimated steady state error by providing at least one step response in the process output at a future time. The next net process input change is then applied according to the sum of the currently determined first element of the set of future process input change signals summed with any future process input change signals that were previously calculated for the next process input change signal that is calculated according to this method. The model is expressed in velocity form. Process tuning parameters are available to dampen the net process input change as well as the currently determined first element of the process input change with respect to a process input change signal that is calculated according to the steady state error divided by the steady state process gain.

69 Claims, 9 Drawing Sheets

OTHER PUBLICATIONS

"Robust Model Predictive Control Of Processes With Hard Constraints", E. Zafiriou, *Computers chem. Engng,* vol. 14, No. 4/5, pp.359–371, 1990.

"Stability of SISO Quadratic Dynamic Matrix Control with Hard Output Constraints", E. Zafiriou and A.L. Marchal, *AIChE Journal,* vol. 37, No. 10, pp. 1550–1560, Oct. 1991.

"The Stability of Constrained Receding Horizon Control", J. B. Rawlings and K. R. Muske, *IEEE Transactions On Automatic Control,* vol. 38, No. 10, pp. 1512–1516, Oct. 1993.

"Robust Stability Analysis of Constrained/$l_1$–Norm Model Predictive Control", Genceli, H. and Nikolaou, M., *AIChE Journal* vol. 39, No. 12, Dec. 1993.

MODEL PREDICTIVE CONTROL APPARATUS AND METHOD

FIELD OF THE INVENTION

The present invention relates to a model predictive control apparatus and method adapted for predicting the future process response of a dynamic model of a controlled system and for calculating a controller output taking such a prediction into consideration. In particular, a suitable column of the pseudo-inverse of the dynamic model is used to provide a process control regulator that minimizes the least squared error.

BACKGROUND OF THE INVENTION

The control apparatus of the present invention is a new type of Model Predictive Control (MPC) controller. MPC technologies, in general, use a process model to predict the future state of a process variable to be controlled, and then manipulate one or more process inputs (controller outputs) to minimize expected error between the prediction and the set points. MPC variations include model predictive heuristic control (MPHC) (Richalet et al., 1978), model algorithmic control (MAC) (Mahra et al, 1979), dynamic matrix control (DMC) (Cutler and Ramaker, 1980; Prett and Gillete, 1979), and linear dynamic matrix control (LDMC) (Garcia and Morshedi, 1986). In all of these methods, the model is an intrinsic part of the control algorithm and is used both for prediction and for computing the controller response.

The basic idea behind MPC is to model a process with the step or impulse response vector of the process. These models predict one or more process outputs from process inputs, and the optimum controller response is computed by means of linear optimization of a series of controller inputs. In existing methods, the optimization problem is solved in real-time, at each step of the controller. Quadratic programming (QP) and linear quadratic regulator (LQ) methods are used for this minimization.

Several problems in prior MPC techniques have limited their use. Most formulations of MPC require the engineer to specify many adjustable parameters to describe the desired closed loop response. An expert on both the process and the controller must make these adjustments, because making the desired response too sharp can lead to unstable performance in some cases, even when the model is a good fit to the process. Furthermore, MPC techniques are not inherently better than classic control, because in theory, there is an equivalent classic controller for every MPC controller.

All MPC controllers that perform QP or LQ optimization on every update interval incur substantial computational overhead. Applications of MPC control are limited to those where a single computer is dedicated to controlling a small number of process variables, typically at intervals of at least several seconds. Most current applications of MPC are performed as supervisory control, where the MPC controller manipulates setpoints of conventional controllers to achieve some overall optimum process performance.

Also, some MPC controllers, particularly those not using QP methods, can become unstable in the presence of constraints found on all real-world processes. The QP-MPC controllers have less difficulty dealing with constraints, but are more computationally complex. In addition, most MPC controllers require either prior knowledge of the process dynamics, or off-line tuning procedures.

In all cases, mismatch between the process and the process model can produce unstable performance. This is often the case when the process response is non-linear. With the high degree of complexity of existing MPC controllers, it is often a difficult task for the engineer using these systems to establish optimum tuning parameters that will provide high control performance over the entire desired operating range.

To solve these problems, fuzzy logic and neural network approaches to continuous process control have been developed recently. Fuzzy logic makes it easier to incorporate heuristic rules into the behavior of a particular controller. This can make it easier to adapt continuous process controllers to specific applications. Neural networks use a generic non-linear modeling method to describe process behavior. The generic modeling of neural networks can be used to automatically develop a process dynamic model to be incorporated into an MPC controller in order to improve performance. However, a neural network model is a black box that yields little information from which to predict optimum control response.

SUMMARY OF THE INVENTION

The controller of the present invention builds on the concepts of MPC control with the goal of creating a general purpose process controller than can replace, for example, Proportional Integral Derivative (PID) control in a high speed, multi-loop, microcomputer-based control system. The advantages sought by this controller are ease of application, automatic tuning, improved control performance, and low computational overhead.

A feature of this invention is automatic model acquisition and tuning without prior knowledge of the process.

Another feature of this invention is performance that is superior to optimally tuned PID, and that approximates theoretically perfect response for sampled process control.

Another feature of this invention is that the computational requirements are very small and well suited to modem CPU architectures.

Another feature of this invention is that complex process dynamics can be handled effectively.

Another feature of this invention is that constraints on process inputs and outputs do not cause instability.

Another feature of this invention is that adaptive control is possible.

Another feature of this invention is that it is fully compatible with and can be used to tune PI and PID controllers.

Another feature of this invention is that it can be made to compensate for non-linear process response.

Another feature of this invention is that it can compensate for signals correlated with process load (feed-forward).

Another feature of this invention is that it can be easily adjusted to achieve any desired process response by the use of dampening and partitioning parameters.

According to one aspect of the invention, these features and advantages are provided by an apparatus and method for controlling the operation of a process having a process input signal and a process output signal, which includes determining a predicted process output signal at a future steady state condition according to a process model, determining a steady state error signal according to the difference between the predicted process output signal and a desired set point signal, and determining a set of future process input change signals required to correct for the estimated steady state error by providing at least one step response in the process output at a future time. The next net process input change is then applied according to the sum of the currently determined first element of the set of future process input change signals summed with any future process input change signals that were previously calculated for the next process input change signal according to this method. The model is preferably expressed in velocity form. In addition, process tuning parameters are available to dampen the net process input change as well as the currently determined first element of the process input change with respect to a process input change signal according to the steady state error divided by the steady state process gain. Further, a clipping filter is provided in order for the controller to account for limitations in the process input dynamic range.

DESCRIPTION OF THE DRAWINGS

The invention will be described in greater detail below with reference to the attached drawings, of which.

DESCRIPTION OF THE PREFERRED EMBODIMENT

Figure 1:
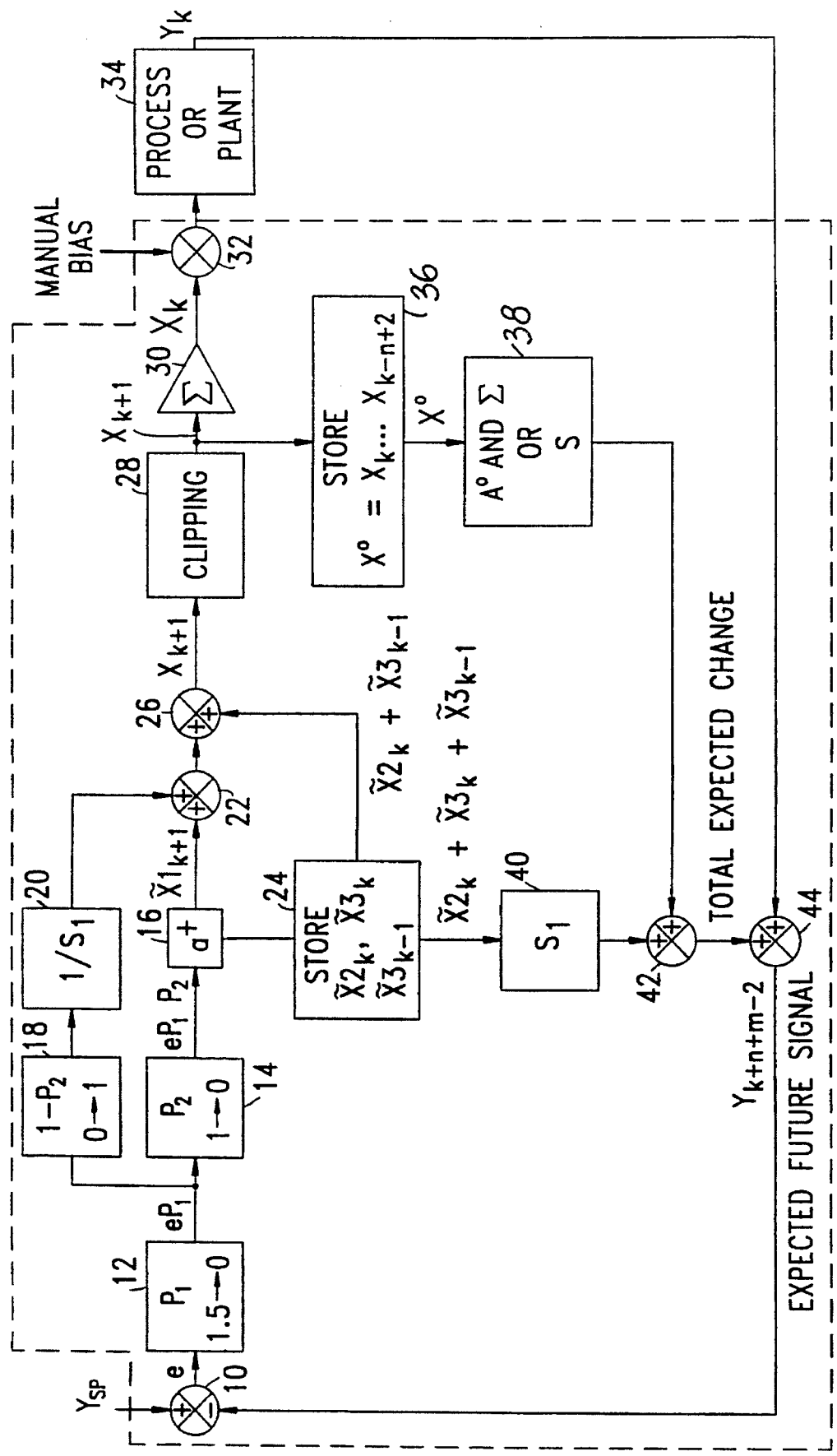
FIG. 1 is a diagram showing the controller architecture of the present invention for m=3.

The following description of the invention will use the notation:

Y The process output to be compared with set point. (The controller input)

X The process input (The controller output)

y A vector describing a set of changes in the process output.

x A vector describing a set of changes in the process input.

a The vector that describes the impulse response of the process.

n The number of elements in the vector a.

i,j Indexes of an element of a given vector.

A The matrix model of the process chosen so that y=Ax.

$x^o$ The last n changes of process input. (Memory of controller output changes).

$A^o$ The integral form of A used to predict future steady state process output.

$y^o$ The predicted future changes in the process output based on $x^o$.

m The number of elements in a set of changes to the process inputs.

h The sampling interval.

w The process dynamic window (event horizon).

$A^{-1}$ The inverse of A.

$A^+$ The pseudo-inverse of A.

$a^+$ The optimal column of $A^+$.

s A vector where each element corresponds to the sum of an $A^o$ column.

$s_1$ The steady state process gain.

$\tilde{x}$ A vector equal to $(EP_1P_2)a^+$.

e The predicted steady state error.

$P_1$ The dampening parameter.

$P_2$ The partitioning parameter.

$Y_{sp}$ The set point.

The controller of the present invention preferably employs an impulse response model that is in velocity form. This model is a simple one that avoids the need for more than one vector of coefficients. The impulse response vector describes the relationship between the relative changes of the process output and the changes in process input as represented by the following equation:

$$y_k = \sum_{i=1}^{n} a_i x_{k-i+1}, \text{ where} \tag{1}$$

$$y_k = Y_k - Y_{k-1} \text{ and } x_k = X_k - X_{k-1} (1)$$

Each element "$a_i$" of the impulse response vector represents the partial change in the process output at any given sampling interval k than can be attributed to a change in a process input at interval k−i+1. This particular formulation of the model has several advantages over other linear models.

First, a model can be developed using a small finite number of samples, reducing computational overhead. For any process that is open-loop stable, there is an event horizon beyond which a particular change in a process input has no significant effect on the process output. Therefore, a vector of length n can be chosen, where n sampling intervals is the event horizon (n=w/h). Vector a accurately approximates the conceptual vector of infinite length, where all elements beyond element n have a value near zero.

Second, the elements of this model may be calculated from either an open or closed loop response of the process to any type of input or set point change. For example, the impulse response model can be determined from applying a step function to the process input (open loop) or controller set point (closed loop). The model is preferably calculated by linear regression of process data. Data taken from a step response in open loop mode is particularly simple to use, because each change in the process input is linearly independent of prior changes in the process input. Robust least squares estimates of the model can use observations from multiple response experiments made over several ranges of process inputs.

Prior MPC controllers use models generally of the form:

$$Y_k = \sum_{i=1}^{n} \bar{a}_i X_{k-i+1} + \sum_{i=1}^{n} \bar{b}_i Y_{k-i} + U \tag{2}$$

In this form, the elements of $\bar{b}$ are the autoregressive coefficients of the model, while the elements of $\bar{a}$ are the coefficients of the dependence of process output on prior values of the process input. U is an unmeasured load or bias on the process that can be inferred from the steady state offset remaining after other terms of this model have been applied. Note that the autoregressive coefficients of the model are not found in the above-described velocity form, so that this velocity form model is strictly an explicit predictive model. Because the velocity model concerns only changes, not absolute values of the process variables, U is eliminated.

Alternate embodiments of the present invention could use models that include one or more implicit terms that would predict change in the process output based on prior changes in the process output. Such models would employ a similar control architecture to that described herein and could also handle processes that are not open loop stable.

The preferred velocity model used in the present invention is extremely versatile. Delays, and n-th order lags are easily modeled. Even complex dynamics where the initial response is in the opposite direction of the final response can be modeled. Process dynamic behavior of any degree of complexity can be modeled, provided the steady state response of the process output is approximately linear with respect to changes in the input and that the process is open-loop stable. Non-linear steady state behavior can be corrected by linearizing transforms on either the process input or output-independent of the dynamic model.

Unlike prior MPC methods, the controller of the present invention is a true velocity controller with integral-only action. It calculates changes in the process input on each update cycle that are integrated with the current process input. It does not require a knowledge of prior process outputs. The velocity nature of the controller eliminates problems with limits in other MPC controllers that are similar to reset-windup in a PID controller. Also, the operator can manually override the controller output while leaving the controller in automatic mode.

Referring to FIG. 1, the controller 1 computes a set of multiple changes to the process input on each cycle. Only the first of these changes is implemented, but the other changes are stored and implemented on future update cycles. The computation of these changes is performed using a pseudo-inverse of the process model. This pseudo-inverse is used because the linear model may not have an exact inverse, depending on the model coefficients. When the measurement of this objective is by least squares, singular value decomposition is a suitable means to find the pseudo-inverse. The pseudo-inverse represents a set of output changes that when applied to the process model, come closest to achieving a unit step response in the process output. In accordance with this invention, a member of the set is selected preferably by a least squares criterion. Other conventional methods of finding the pseudo-inverse may also be used. The pseudo-inverse of the process model is explicitly determined from the coefficients of the model. It can be found once (as the model is acquired). For this reason, there is no further need for optimization upon each step of the controller.

The architecture of the controller 1 of the present invention is also notably different from prior MPC controllers. The output from the summer 42 of the controller is added to the current process output $Y_k$ rather than subtracted from it as is done in other MPC controllers. Prior process input changes are saved in memory 24 and used to predict future process behavior. The controller acts only on the difference between this prediction $Y_{k+n+m-2}$ and the set point $Y_{sp}$, not on modeling error or current process output. This controller differs from prior MPC controllers in that there is no equivalent classic controller. In fact, the controller 1 of the present invention can produce closed loop performance that is superior to classic PID style controllers in most applications.

In addition, the controller 1 may handle constraints on the manipulated outputs $Y_k$ by modifying the set of controller changes to one that can be implemented. This technique is referred to as clipping. Furthermore, tuning to fine tune the controller performance and improve robustness in the presence of model-process mismatch may also be achieved by modifying the controller output.

Figure 2A:
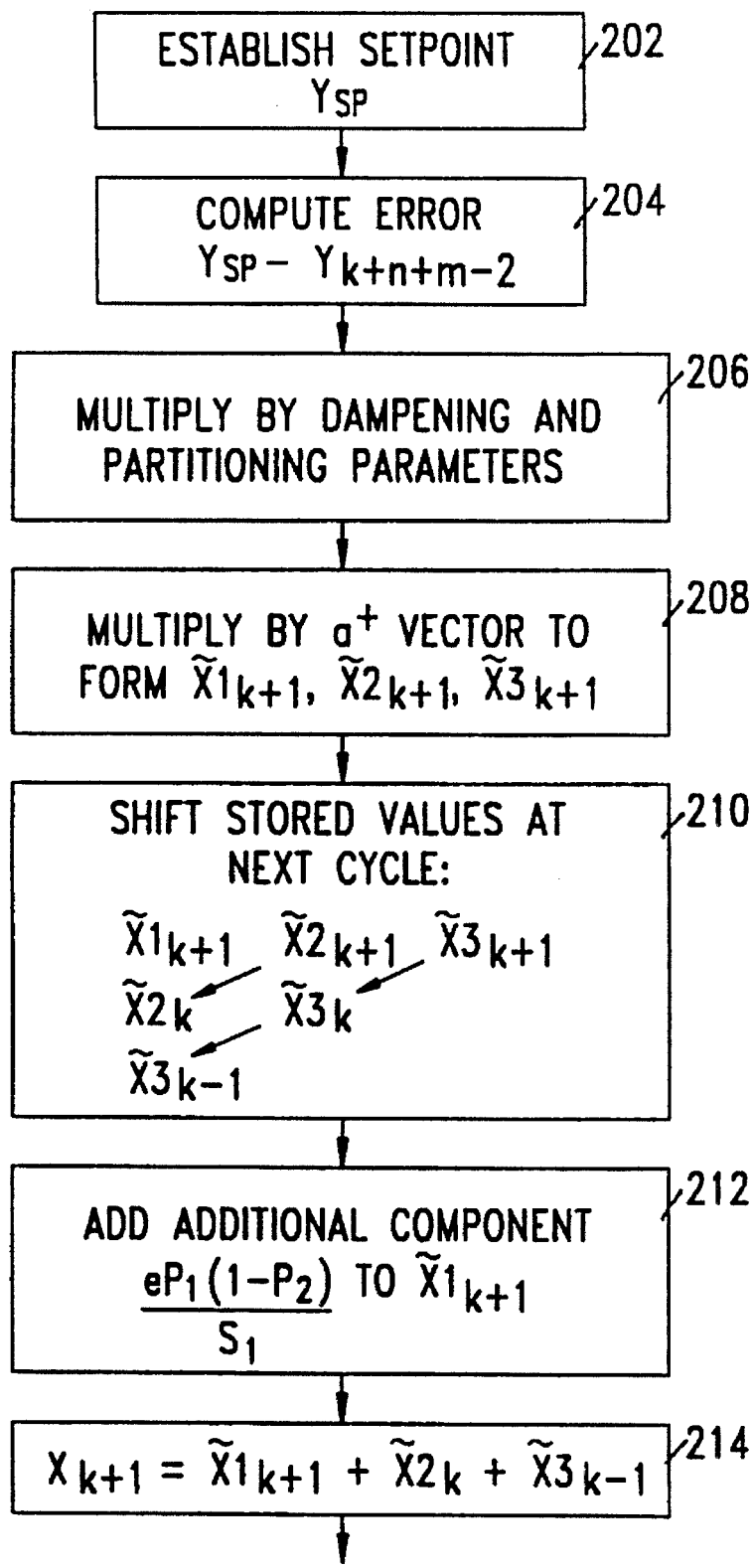
FIGS. 2A–2C show a flow chart depicting the controller protocol for m=3.
Figure 2B:
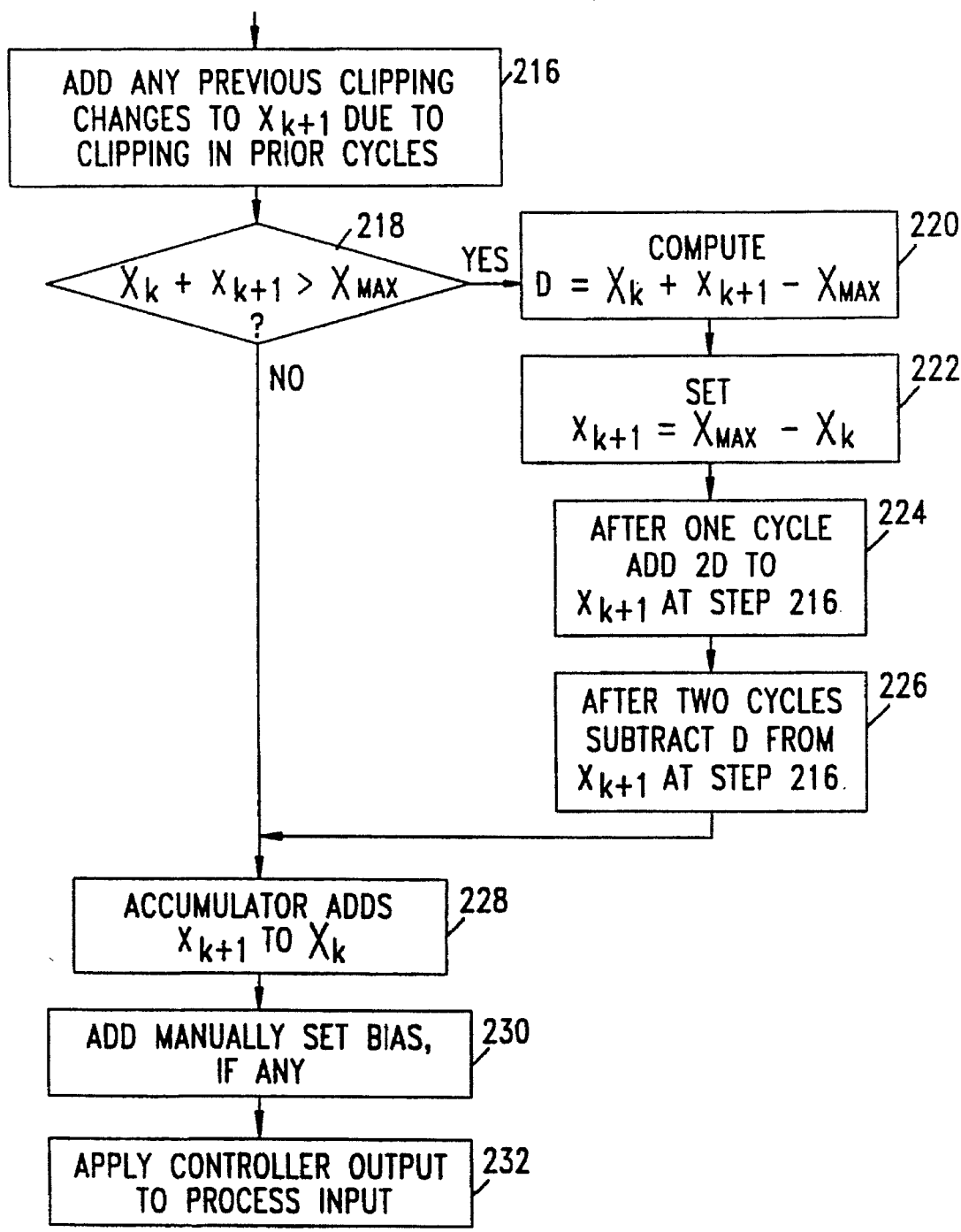
Figure 2C:
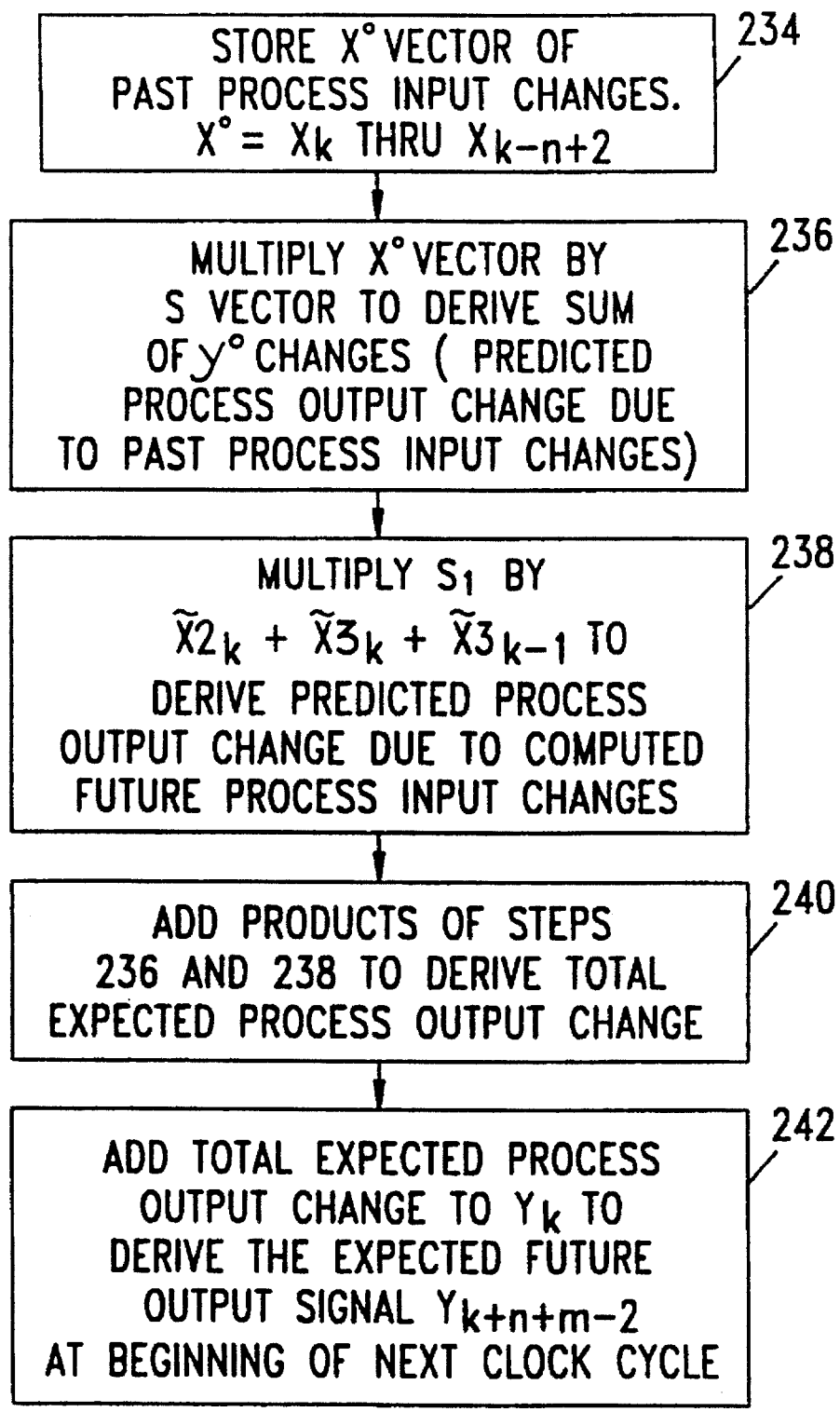

An embodiment for carrying out the foregoing methodology is illustrated in block diagram form by FIG. 1, while the corresponding steps are shown in FIG. 2A-2C. FIGS. 1 and 2A-2C describe an m=3 embodiment, however, controller operation for other values of m may readily be appreciated.

Notably, the controller contemplated by the invention may be implemented programmatically or by direct electrical connection through customized integrated circuits, or a combination of both, using any of the methods known in the industry for providing the functions described below without departing from the teachings of the invention. Those skilled in the art will appreciate that from the disclosure of the invention provided herein, commercial semiconductor integrated circuit technology would suggest numerous alternatives for actual implementation of the inventive functions of the controller that would still be within the scope of the invention.

Controller 1 controls output $Y_k$ of process or plant 34. The subscript k refers to the current cycle of the controller. Hence, during the current cycle k, the process input (controller output) is $X_k$ and the process output is $Y_k$. Controller 1 by means of set point $Y_{sp}$ regulates process output $Y_k$ (step 202). Summer 10 computes the error signal e from $Y_{sp}-Y_{k+n+m-2}$ (step 204). In the case of m=3 the expected future signal is $Y_{k+n+1}$. Next, the error signal is multiplied by two tuning parameters, namely, dampening parameter $P_1$ and partitioning parameter $P_2$, respectively, at blocks 12 and 14 (step 206). These are optional parameters used to tune the controller and may each be set to "1" if not used.

The error signal (as modified by the tuning parameters) is then multiplied by the $a^+$ vector stored in block 16 which may be any suitable memory device (step 208). Block 16 calculates the values $\tilde{x}1_{k+1}$, $\tilde{x}2_{k+1}$, $\tilde{x}3_{k+1}$ during the k cycle for application to the process over the next three cycles. The values calculated in block 16 are shifted into block 24 at the next cycle (step 210). Block 24, which for example may be implemented as shift registers, stores prior calculated values $\tilde{x}2_k$, $\tilde{x}3_k$ and $\tilde{x}3_{k-1}$. These values also get shifted at the next cycle.

An additional component is added to $\tilde{x}1_{k+1}$ at summer 22 (step 212). This component is due to the effect of partitioning and is formed by multiplying the output of block 12 ($eP_1$) by $1-P_2$ at block 18 and by further multiplying by $1/s_1$ at block 20. The output of summer 22 is added to $\tilde{x}2_k + \tilde{x}3_{k-1}$ from block 24 so as to take into account input changes calculated during the previous two cycles (step 214).

The clipping block 28 adds any previous clipping changes to $x_{k+1}$ due to clipping in prior cycles (step 216). The clipping function determines whether the controller output will fall outside the maximum $X_{max}$ or minimum $X_{min}$ values allowable at the process input. FIG. 2 describes the maximum range situation though this may readily be extended to the minimum range situation. If $X_k + x_{K+1} > X_{max}$ then $D = X_k + x_{K+1} - X_{max}$ is computed. The value $X_{k+1}$ is set to $X_{max} - X_k$. At step 216, 2D is added to $x_{k+1}$ after one cycle and D is subtracted from $x_{k+1}$ after two cycles. (Steps 218-226).

The above-described functions relating to blocks 16, 24 and 28 of FIG. 1 may alternatively and preferably be implemented as follows. Block 24 would contain a single linear shift register which, in the case of m=3, would use three elements. The first element would contain the value of $\tilde{x}2_k + \tilde{x}3_{k-1}$ to which is added $eP_1 (1-P_2)/s_1$. The second element would contain $\tilde{x}3_k$. The third element would initially be 0. The computed values for $\tilde{x}1_{k+1}$, $\tilde{x}2_{k+1}$, $\tilde{x}3_{k+1}$ from block 16 would then be added, respectively, to the first, second and third elements of the shift register in block 24. These three values from block 24 would all be sent to a clipping block for adjustment as described above, and then returned to the shift register 24.

The first element of the shift register now contains the desired input change and is sent to accumulator 30. The remaining elements of the shift register are shifted once to the left in preparation for the next cycle. The above-described methodology though computed for m=3 can readily be extended to other values of m.

The accumulator 30 adds the newly computed value $x_{k+1}$ to $X_k$ (step 228). An optional manual bias function is provided by summer 32 (step 230). The controller output $X_k$ is applied to the input of process or plant 34 (step 232).

The total expected future output change is calculated as follows. Storage block 36, which for example may be implemented as a shift register, stores the vector $x^o$ representing prior process input changes. Upon each new cycle the $x_{k+1}$ value is shifted into this register and all existing values are shifted to the right (Step 234). At block 38, the $x^o$ vector is multiplied by the s vector to derive the predicted process output change due to past process input changes (step 236).

The summed values $\tilde{x}2_k + \tilde{x}3_k + \tilde{x}3_{k-1}$ from block 24 are multiplied by $s_1$ at block 40 to derive the predicted process output change due to computed future process input changes (step 238). The outputs of blocks 40 and 38 are added at summer 42 to derive the total expected future process output change (step 240). This value is then added to $Y_k$ at summer 44 to derive the expected future output signal $Y_{k+n+m-2}$ (step 242). Upon each new cycle the current set point is read, the current process output is sampled, and $Y_{k+n+m-2}$ is computed.

Theory of Operation

As described hereinabove, an equation representing an embodiment of the velocity model of the present invention may be expressed as:

$$y_k = \sum_{i=1}^{n} a_i x_{k-i+1}, \text{ where} \tag{3}$$

$$y_k = Y_k - Y_{k-1} \text{ and } x_k = X_k - X_{k-1}$$

which may be conveniently represented in matrix notation as:

$$y = Ax \tag{4}$$

where A is a n+m−1 by m matrix and x is an m element vector (e.g., m×1 column matrix) of process input changes.

Since this model represents a change in the process output as a weighted sum of a number of past input changes, where the $a_i$ coefficients are the weighting factors, it is referred to herein as a velocity model.

Once the model coefficients of the process are determined, the model is conveniently represented as a matrix A, defined by equation 4. Accordingly, if at some time characterized by the index k the process is not at steady state and if an n−1 element vector $x^o$ of prior input change signals (i.e., $x_{k-n+2}$, $x_{k-n+3}$, ... $x_k$) is known, and the process output signal $Y_k$ is also known, assuming no further process input changes occur the steady state output value $Y_{k+n-1}$ may be calculated corresponding to the future point k+n−1, after which no further output changes occur. Explicitly, $Y_{k+n-1}$ may be determined by first performing the matrix multiplication $A^o x^o$ to provide a vector of predicted output change signals $y^o_{k+1}, y^o_{k+2} \ldots y^o_{k+n-1}$, and then summing the elements of the predicted output change vector and adding the result to $Y_k$. This concept is similar to the idea of a prediction horizon approach of model predictive control. Accordingly, the defining equations are:

$$y^0_{k+p} = \sum_{i=p+1}^{n} a_i x^0_{k+p-i+1} \tag{5}$$

$$Y_{k+p} = Y_k + \sum_{i=1}^{p} y^0_{k+i} \tag{6}$$

where for p greater than n−1 $y^o$ is zero valued. $A^o$ may be explicitly written as:

$$A^o = \begin{matrix} a_n & \ldots & a_3 & a_2 \\ 0 & \ldots & \ldots & \ldots \\ 0 & \ldots & a_n & a_{n-1} \\ 0 & \ldots & 0 & a_n \end{matrix}, \text{ and } A^o x^o = y^o$$

It is further understood that if at the time characterized by k, with $Y_k$ and $x^o$ known, one may express the effects of m subsequent (i.e., future) input change signals characterized by the vector x (i.e., $x_{k+1}, x_{k+2} \ldots x_{k+m}$) by generating a matrix A' that is an extension of the above $A^o$ matrix by an additional m columns and m rows. That is:

$$A' = \begin{matrix} a_n & \ldots & a_2 & a_1 & 0 & \ldots & 0 \\ 0 & \ldots & \ldots & a_2 & a_1 & \ldots & 0 \\ \cdot & & & \ldots & & \ldots & \ldots \\ \cdot & \ldots & a_n & \ldots & \ldots & & a_1 \\ \cdot & \ldots & & a_n & a_{n-1} & & \cdot \\ \cdot & & & 0 & a_n & & a_{n-1} \\ 0 & & 0 & & \ldots & & a_n \end{matrix}$$

It can be seen that A' may be partitioned into two matrices, $A^o$ and A, and thus, the sum of the process output changes for each interval from k+1 to k+n+m−1 may be represented as:

$$\sum_{p=1}^{m+n-1} y'_{k+p} = \sum_{p=1}^{n-1} (A^o x^o)_{k+p} + \sum_{p=1}^{n+m-1} (Ax)_{k+p} \tag{7}$$

That is, it is understood from this equation that the predicted process output signal at k+n+m−1 is equal to the predicted process output signal at k+m−1 that is based on past process input changes plus the sum of the process output changes due to future process input changes x. It is also understood that the vector y (i.e., Ax) is equivalent to the process output changes that occur due to process inputs x applied when the system is at steady state (i.e., $x^o$=0). It is convenient, as will be further understood hereinbelow, to define:

$$s_k = \sum_{i=k}^{n} a_k \tag{8}$$

from which equation 7 may be rewritten as:

$$\sum_{p=1}^{m+n-1} y'_{k+p} = \sum_{p=1}^{n-1} s_{i+1} x^o_{k-i+1} + s_1 \sum_{i=1}^{m} x_{k+i} = sx^o + s_1 \tilde{i}x \tag{9}$$

where $\tilde{i}$ is a vector in which each dement is unity. It is understood that implicit to the notation used, a product of two vectors corresponds to an inner (i.e., scalar) product formed by performing the matrix multiplication of the transpose of the first vector (i.e., producing a row matrix) by the second vector (i.e., column matrix), resulting in a scalar quantity.

Equation 9 replaces performing the matrix multiplication $A^o x^o$ followed by summing the resulting output vector, with the step of forming sums from the columns of $A^o$ (i.e., $s_2 \ldots s_n$) to obtain a vector s so that multiplication of the vector of prior changes $x^o$ by s produces this sum directly. Similarly, the scalar quantity $s_1$ represents the sum of any single column of A, and thus the sum of the future process changes due to the future process inputs may be simply represented as shown.

The steady state process error at the future time represented by k+m+n−1 may be expressed as:

$$\tilde{e} = Y_k + \sum_{p=1}^{m+n-1} y'_{k+p} - Y_{sp} = \qquad (10)$$

$$\left[ Y_k + \sum_{p=1}^{n-1} (A^o x^o)_{k+p} - Y_{sp} \right] + \sum_{p=1}^{n+m-1} (Ax)_{k+p}$$

from which it may be recognized that the term in brackets is the steady state error (i.e., defined as e) at k+n−1. Thus, it is further recognized that the error $\tilde{e}$ may be reduced to zero by selecting future process input signals x that result in the final term of equation 10 cancelling the error e. Referring to equation 9, it can be seen that a possible solution is for the sum of the x vector elements to equal the negative of the error divided by the steady-state process gain. A simple example would be to select all elements of x to be zero except one element which would have a magnitude equal to the negative of the predicted error divided by the steady-state process gain. This corresponds to deadbeat control, and can be seen to provide a slow cancelation of the error.

In accordance with the present invention, it is recognized that a preferred control methodology is to determine x such that at least one step response output occurs at some future time that cancels the error e. Preferably, a single step response process output is employed, and this step response is generated as early in time as possible. It may be gleaned from equation 10 and A' that providing a step correction before k+n−1 to render $\tilde{e}$ zero valued is equivalent to canceling the error e, and thus, the error at k+n−1 will be zero, and no further output changes will occur thereafter (i.e., steady state). It may further be appreciated that this criterion is equivalent to setting one element of y equal to 1 and all other elements equal to zero, and solving y=Ax for the future process inputs x, which must then be scaled by the error. Such a solution x may be used at any iteration to provide process control; at each iteration, the error e is calculated and then multiplied by x.

In accordance with the foregoing description, it may be understood that since on each iteration m future process input change signals are determined, on each k there will be m−1 estimated future values of process input changes from the previous (e.g., k−1) iteration that have not yet been implemented, m−2 estimated future values of process input changes from the k−2 iteration that have not yet been implemented, etc. That is, for a given k+i future process input change, there are m−i previously calculated process input change values from previous iterations. As understood from above, the effect of the future input changes on the final steady state output may be directly determined by multiplying the sum of the future input changes by the steady state process gain $s_1$, and thus, the above equations may be modified to include these previously calculated future process input changes accordingly. That is, the error term $\tilde{e}$ in equation 10, becomes:

$$\tilde{e} = Y_k + sx^o + s_1 x' - Y_{sp} \qquad (11)$$

where x' is a scalar quantity representing the sum of the previously calculated future process input changes for all future times up to k+m−1 in the future. These future values may be accumulated on each cycle. Then, the predicted future steady state error that takes into account previously calculated future process inputs m−1 intervals in the future corresponds to the steady state error at k+n+m−2. In order to effect a cancellation of the steady state error at the point k+n+m−2, a vector x is determined which will cancel the error by resulting in a step response having a magnitude equal to the predicted steady state error. Then the next net process input change signal applied to the process will be the sum of the first element of the current x (i.e., $x_{k+1}$) and the (k+j+1)th element from any previously calculated process input change vectors j intervals in the past with j ranging from one to (m−1).

As stated, based on the current knowledge of the set point, the current value of the process output, the prior process inputs, and the previously calculated future process input changes (accumulated as x'), the remaining process error at this future steady state condition may be calculated according to equation 11. The general goal of process control is to find a vector of changes to the process input x that will eliminate this expected future process error as quickly as possible. The ideal process response vector would have a single non zero value in the first element precisely equal and opposite in sign the expected error. It is not obvious that such perfect control is a practical objective. For an analog system, perfect control is not only impossible, but cannot be defined in terms of a continuous signal. "Perfect" control is only achievable with respect to a given sampling interval. Implied in this definition is that for a real process, the values of a process output that occur between sample intervals may not necessarily change in linear fashion. Perfect control therefore only appears perfect from the perspective of the discrete samples. Intersample rippling can be a problem when process lag times are small relative to the sample interval.

The goal of a perfect step response is a different way of posing the control objective than the linear minimization problem of prior IMC controllers. In other IMC controllers, deadbeat tuning is impossible for processes with lag and can result in unstable tuning. In accordance with the present invention, the one-cycle objective is altered to one cycle plus the process deadtime. This objective achieves a result that minimizes RMS process error for a set point change. In accordance with a feature of the method and system of the present invention, this step response process control objective is achieved by setting y according to the desired change and then solving for x using matrix algebra. The solution for x can be found quickly by computing the inverse $A^{-1}$ once and then simply multiplying the determined x by the error for each step of the algorithm. Through this method, the computation required can be reduced to just two vector multiplications per update as compared with a complex linear optimization required by previous MPC methods.

A practical difficulty encountered with using linear algebra for most real processes is that in the presence of delays, matrix A will have zeros or very small values on the diagonal. This fact guarantees that the matrix is ill conditioned. If m<n there will be more than one solution. Strictly speaking, $A^{-1}$ frequently does not exist. However, in accordance with conventional matrix algebra techniques, a "pseudo-inverse" may be calculated that has properties that are ideally suited to solve the general problem of process control. The pseudo-inverse is determined by singular value decomposition (SVD). SVD factors the original matrix into two orthogonal and normalized matrixes and one diagonal matrix containing the "singular" values (i.e., LSR=A). This factorization can be used to build a pseudo inverse $A^+$ by computing the inverse of the non-zero singular values and multiplying by the transpose of the left and right parts of the original decomposition. This pseudo inverse is a non-square m by n matrix that contains all the information needed to find the optimum set of changes to the process input. Once the pseudo inverse has been computed, it may be applied again and again, and it acts as the optimum tuning constants for the controller.

The desired process response is still represented by a vector that has only one non-zero element equal to the total change desired. However, because the process may contain dead time ($t_D$), and thus it may be impossible to make a change in the next sample interval, the ideal response vector must be changed to one that can be actually achieved. Instead of setting the first element to the desired change, the element $y_i$, where $i=t_D/h$, is set and all other elements are set to zero.

In accordance with the control criterion of the present invention, several attendant advantages may be recognized. First, because the desired response vector has only one non-zero element, only one column of the pseudo-inverse is needed to perform control calculations. That is, the pseudo-inverse operating on a desired response vector which has a "1" as the jth element produces a solution x equal to the jth column of the pseudo-inverse. Second, the pseudo-inverse already contains the information needed to determine the process dead time, even if it is unknown.

Thus, to determine the column of the pseudo-inverse that best produces a step output response, each column may be applied as an input, and the respective outputs compared according to some measure. Applying each column of the pseudo-inverse as an input corresponds to generating the matrix $AA^+$. A method for selecting the best column of the pseudo-inverse is to compute an error vector by subtracting the identity matrix from the above matrix and then summing the squares of each column. An additional consideration is providing the response as early in the future as possible (e.g., the best left-most column of the pseudo-inverse). It may be appreciated that in certain situations it may be preferable to form a weighted average of a plurality of columns. The selected solution is defined as $a^+$, and stored for use on each iteration of the process control system and method, as described above.

Calibration

Upon actuation of the control process and system of the present invention, and during its operation as an adaptive control system, a calibration routine is implemented. This calibration process automatically determines and stores the constants corresponding to the elements of $a^+$ employed by the controller to calculate the output changes x, and to the elements of s employed by the model to calculate the total output changes. This calibration process preferably uses matrix algebra techniques to extract the velocity model impulse response coefficients $a_i$. From these coefficients, the model for predicting future output changes may be expressed and simplified to provide s, and $a^+$ may be determined according to a control criterion. The calibration task may generally be performed by a separate program in a multi-tasking environment which executes calibration upon activation of the control system and may also operate continuously during process control to achieve adaptive control.

Figure 3:
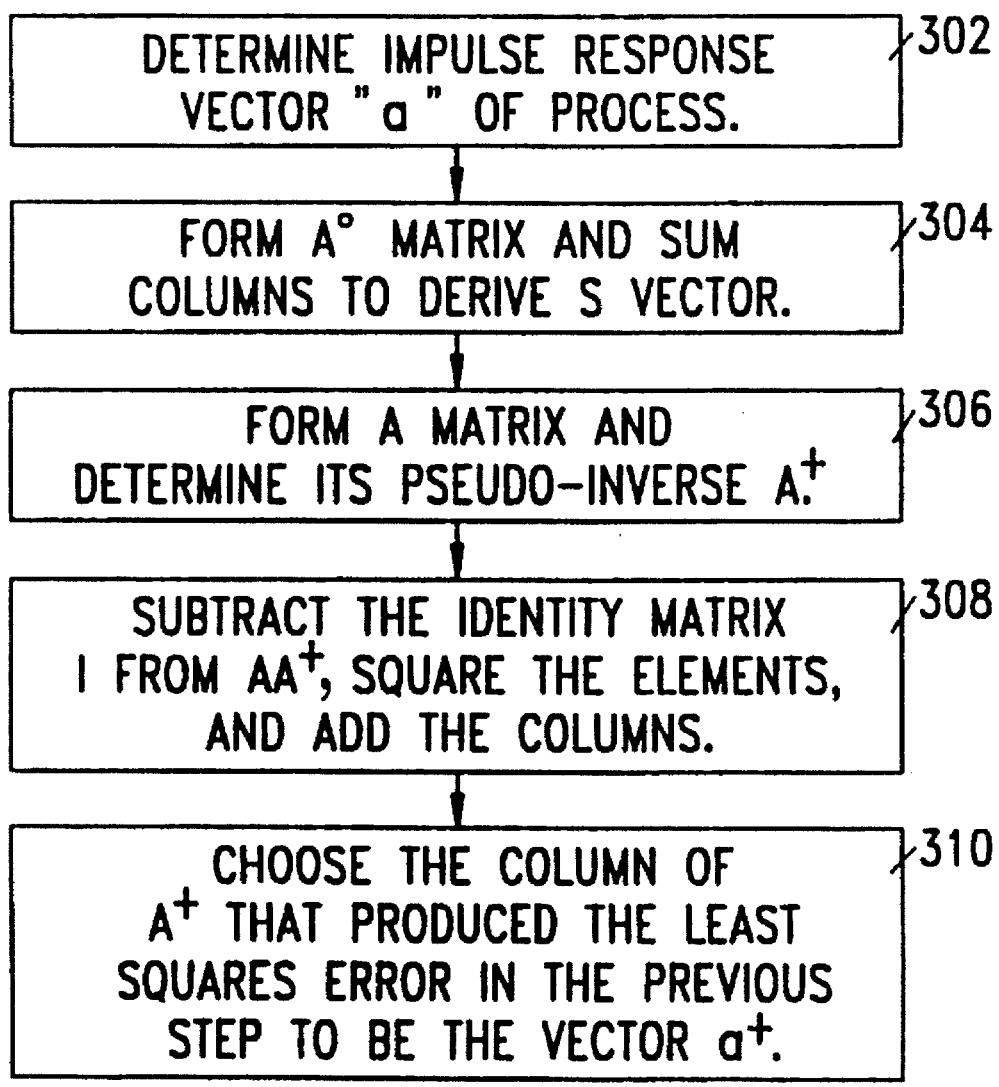
FIG. 3 shows a flow chart illustrating the controller calibration procedure.

Referring to FIG. 3, the calibration process is now described. It may be understood that the coefficients $a_i$ correspond to the impulse response of the process. In step 302, the coefficents $a_i$ are preferably chosen to minimize some measure of the estimate errors according to a linear regression between process outputs and process inputs. For example, one common measure is the means square error, averaged over many samples. By way of example, process inputs and outputs are sampled and stored during a window preferably at least 2n+m samples long in which there are changes made to the process input (e.g., a step input or any arbitrary input). The impulse response model coefficients $a_i$ may then be determined by performing multiple linear regression. It is understood, however, that there are many ways to apply the regression technique. For instance, the regression technique may be statistically averaged over multiple periods, wherein during each period arbitrary or non-arbitrary process inputs are applied. In the case where non-arbitrary process inputs are selected, these may be applied over different ranges of the process input dynamic range. For example, a series of unit step process inputs may be applied to span the process input range. Similarly, a series of step process inputs may be applied, each of which has a different step height value. An example of a non-arbitrary process input is the process input signal during process control.

Once the coefficients $a_i$ have been determined, in step 304 the s vector elements and the steady state process gain $s_1$ are calculated and stored. In step 306, the psuedo-inverse of A (i.e., $A^+$) is calculated by SVD. Then, in step 308 the product $AA^+$ is formed, from which the identity matrix is subtracted, the resulting elements squared, and the columns summed to provide an error vector. In step 310, the column of $A^+$ that produced the least squares error in step 308 is selected and assigned as $a^+$ which is stored for use on subsequent iterations of the controller 1 until it is updated (e.g., adaptive control).

In the foregoing, it is assumed that the value of m is known. As will be discussed further below, m may be determined according to some knowledge of the process dynamics, and also may be determined by testing the process control for different values of m to ascertain the minimum value of m required to provide the desired process control.

The following examples are presented to illustrate features, characteristics, and steps of the present invention, which is not to be construed as being limited thereto.

Given that the process inputs have been constant for n cycles, the process outputs must be at steady state. It is possible to predict a vector of process changes y for any given set of input changes x, and this prediction can be performed using matrix multiplication.

In this multiplication, the impulse response vector of length n is used to build the lower triangular non-square matrix A with n+m−1 rows, and m columns as shown in the following example.

EXAMPLE 1

In this example an imaginary process has a first order lag+dead time response. The lag T equals 2 cycles, and the dead time is one cycle. The overall process gain is 1.0. The process is initially at steady state, but at a particular point in time, the process input is changed in three steps to the values: $X_o+4, X_o, X_o+1$. A 10 element impulse response model is constructed from knowledge of the process.

In practical applications, detailed knowledge of the process is not known, and regression is preferably performed to ascertain the impulse response model. In this example, however, samples of a step response can be estimated by the recursion formula:

$$Y_i = \frac{Y_{i-1}T}{1+T} + \frac{X_i}{1+T} \tag{12}$$

-continued

| $Y_1$ | $Y_2$ | $Y_3$ | $Y_4$ | $Y_5$ | $Y_6$ | $Y_7$ | $Y_8$ | $Y_9$ | $Y_{10}$ |
|---|---|---|---|---|---|---|---|---|---|
| 0 | .333 | .556 | .704 | .802 | .868 | .912 | .941 | .961 | .974 | taking differences between each sample produces the impulse response vector. $a_i = y_i - y_{i-1}$

| $a_1$ | $a_2$ | $a_3$ | $a_4$ | $a_5$ | $a_6$ | $a_7$ | $a_8$ | $a_9$ | $a_{10}$ |
|---|---|---|---|---|---|---|---|---|---|
| 0.0 | 0.333 | 0.222 | 0.148 | 0.099 | 0.066 | 0.044 | 0.029 | 0.020 | 0.013 |

The input change vector in this example has three elements:

| $x_1$ | $x_2$ | $x_3$ |
|---|---|---|
| 4 | −4 | 1 |

Knowing that the overall process gain is 1.0, the ultimate total change in the process must be equal to the sum of x. To estimate all intermediate process responses, the whole process response vector must be calculated by matrix multiplication.

The matrix model A is constructed as a 12×3 matrix having members selected from vector a, diagonally offset down by one row in each column of the matrix. The remaining elements are filled with zero. Each column of the matrix represents the weighting factors used to establish the partial change in process output at one future sample interval associated with a particular element of the process input vector.

$$A \equiv \begin{bmatrix} a_1 & 0 & 0 \\ a_2 & a_1 & 0 \\ a_3 & a_2 & a_1 \\ a_4 & a_3 & a_2 \\ a_5 & a_4 & a_3 \\ a_6 & a_5 & a_4 \\ a_7 & a_6 & a_5 \\ a_8 & a_7 & a_6 \\ a_9 & a_8 & a_7 \\ a_{10} & a_9 & a_8 \\ 0 & a_{10} & a_9 \\ 0 & 0 & a_{10} \end{bmatrix}, \text{ and } Ax = y$$

Applying the model A to the changes x is now simply a matter of matrix multiplication, resulting in a single output vector length 12.

| $y_1$ | $y_2$ | $y_3$ | $y_4$ | $y_5$ | $y_6$ | $y_7$ | $y_8$ | $y_9$ | $y_{10}$ | $y_{11}$ | $y_{12}$ |
|---|---|---|---|---|---|---|---|---|---|---|---|
| 0.0 | 1.330 | −0.444 | 0.037 | 0.026 | 0.016 | 0.011 | 0.007 | 0.005 | 0.003 | −0.032 | 0.013 |

The same matrix A can be used to determine the expected process output changes for any given set of three process input changes. It also can be seen from this example that the sum of the expected process output changes may be represented by the product of $s_1$ (e.g., the sum of one column of A) and the sum of the x components.

EXAMPLE 2

The process of selecting the best vector from the pseudo inverse is illustrated by the following example.

In this example, a complex dynamic process model is represented by a 10 element vector. The coefficients of this model were computed for a gain of 1, a dead time of 2 samples, and a second order lag with a time constant of 3 and a damping factor of 0.8. The results shown were computed in double precision, but only the first four decimal places will be displayed for convenience.

The model coefficients are:

0.0000 0.0000 0.1835 0.2256 0.2016 0.1547 0.1069 0.0676 0.0390 0.0200

In this example, a pseudo-inverse will be found that can predict an optimum set of three input changes that will correct any error. First, the model is put in matrix form as in example 1. That is, the process model is represented by the following 12×3 matrix:

| 0.0000 | 0.0000 | 0.0000 |
|---|---|---|
| 0.0000 | 0.0000 | 0.0000 |
| 0.1835 | 0.0000 | 0.0000 |
| 0.2256 | 0.1835 | 0.0000 |
| 0.2016 | 0.2256 | 0.1835 |
| 0.1547 | 0.2016 | 0.2256 |
| 0.1069 | 0.1547 | 0.2016 |
| 0.0676 | 0.1069 | 0.1547 |
| 0.0390 | 0.0676 | 0.1069 |
| 0.0200 | 0.0390 | 0.0676 |
| 0.0000 | 0.0200 | 0.0390 |
| 0.0000 | 0.0000 | 0.0200 |

This matrix is then decomposed by singular value decomposition to give two matrices and a vector of the singular values. The details of this procedure are well known to one skilled in the art. The resulting left and right matrices are orthogonal, so their transpose is equivalent to their inverse. Also, the sum of squares of each row and column of these matrices is equal to 1.0.

The R (i.e., right) matrix is calculated as:

| 0.5607 | 0.7071 | −0.4309 |
|---|---|---|
| 0.6094 | 0.0000 | 0.7929 |
| 0.5607 | 0.7071 | −0.4309 | and the L (i.e., left) matrix is represented by the following

| 0.0000 | 0.0000  | 0.0000  | 0.7302  | 0.5303  | 0.3506  | 0.2120  | 0.1159  | 0.0550  | 0.0197  | −0.0110 | −0.0278 |
|--------|---------|---------|---------|---------|---------|---------|---------|---------|---------|---------|---------|
| 0.0000 | −0.0001 | 0.0000  | 0.5408  | −0.1658 | −0.4270 | −0.4565 | −0.3850 | −0.2848 | −0.1911 | −0.1344 | −0.0740 |
| 0.1561 | 0.5405  | −0.8242 | 0.0011  | −0.0009 | −0.0015 | −0.0014 | −0.0012 | −0.0009 | −0.0005 | 0.0457  | −0.0451 |
| 0.3616 | 0.6645  | 0.5035  | 0.1740  | −0.2973 | −0.0245 | 0.0926  | 0.1240  | 0.1142  | 0.0892  | 0.0626  | 0.0782  |
| 0.5362 | 0.0532  | 0.1349  | −0.2977 | 0.6913  | −0.2566 | −0.1880 | −0.1252 | −0.0763 | −0.0421 | −0.0202 | 0.0062  |
| 0.5099 | −0.2088 | −0.0419 | −0.0250 | −0.2567 | 0.6947  | −0.2693 | −0.2051 | −01409  | −0.0886 | −0.0507 | −0.0246 |
| 0.4055 | −0.2787 | −0.1072 | 0.0922  | −0.1882 | −0.2694 | 0.7465  | −0.2004 | −0.1417 | −0.0915 | −0.0540 | −0.0329 |
| 0.2880 | −0.2566 | −0.1145 | 0.1237  | −0.1254 | −0.2052 | −0.2005 | 0.8382  | −0.1161 | −0.0759 | −0.0454 | −0.0302 |
| 0.1866 | −0.2002 | −0.0966 | 0.1140  | −0.0764 | −0.1410 | −0.1418 | −0.1161 | 0.9158  | −0.0556 | −0.0335 | −0.0236 |
| 0.1105 | −0.1402 | −0.0713 | 0.0890  | −0.0422 | −0.0886 | −0.0915 | −0.0759 | −0.0556 | 0.9630  | −0.0225 | −0.0165 |
| 0.0516 | −0.1148 | −0.0098 | −0.0808 | −0.0165 | −0.0536 | −0.0590 | −0.0505 | −0.0377 | −0.0255 | 09829   | −0.0114 |
| 0.0170 | −0.0589 | −0.0897 | 0.0604  | 0.0024  | −0.0219 | −0.0280 | −0.0253 | −0.0196 | −0.0136 | −0.0074 | 0.9910  | whereas, the singular values are calculated as:

0.6589 0.2400 0.0959

At this point, a choice must be made to accept all these singular values as significant, or to reject one if it is much smaller than the rest. A 3×12 matrix is now constructed having the inverse of the accepted singular values on the diagonal. If small singular values were rejected, the corresponding value on the diagonal would be set to zero.

The matrix formed from the inverse of the singular values is:

| 1.5176 | 0.0000 | 0.0000  | 0.0000 | 0.0000 | 0.0000 | 0.0000 | 0.0000 | 0.0000 | 0.0000 | 0.0000 | 0.0000 |
|--------|--------|---------|--------|--------|--------|--------|--------|--------|--------|--------|--------|
| 0.0000 | 4.1658 | 0.0000  | 0.0000 | 0.0000 | 0.0000 | 0.0000 | 0.0000 | 0.0000 | 0.0000 | 0.0000 | 0.0000 |
| 0.0000 | 0.0000 | 10.4242 | 0.0000 | 0.0000 | 0.0000 | 0.0000 | 0.0000 | 0.0000 | 0.0000 | 0.0000 | 0.0000 |

The pseudo-inverse is now computed from the product of $RSL^T$, and is given by the following 3×12 matrix:

| −0.0003 | −0.0002 | 5.4271  | 0.0036  | 0.0069  | 0.0069 | 0.0054  | 0.0039  | 0.0029  | 0.0012  | −0.2499 | 0.2442  |
|---------|---------|---------|---------|---------|--------|---------|---------|---------|---------|---------|---------|
| 0.0004  | 0.0000  | −6.6682 | 4.4959  | 1.6112  | 0.1252 | −0.5110 | −0.6802 | −0.6256 | −0.4872 | −0.0337 | −0.7260 |
| −0.0001 | 0.0001  | 2.2428  | −3.9112 | −0.3066 | 1.2373 | 1.6476  | 1.5149  | 1.1823  | 0.8275  | 0.4262  | 0.5909  |

The pseudo inverse is a 3×12 matrix that contains 12 vectors from which the best vector for implementing a step response should be chosen. To choose, multiply the original process model in matrix form by the pseudo inverse. Each column of this 12×12 matrix represents the expected process response to an input formed from one of the columns of the pseudo inverse. For this numerical example, the product of the pseudo-inverse and process model yields the following 12×12 matrix:

the best possible result must include the process delay of two cycles. The best column of the product of the pseudo inverse and the process model is one that comes closest to a single unit step change. Column 3 comes closest to this objective. Notice also, that except for the first two columns, the totals of each column are approximately 1.0. This means that even if the process dynamic model is imperfect, the steady state process response will be correct. To automate the selection process for the best column, compute an error vector by subtracting the identity vector from the above matrix and then sum the squares of each column. This selection process results in the following vector of the sum of errors squared:

1.0000 1.0000 0.0041 0.1742 0.6914 0.6946 0.7464 0.8382 0.9158 0.9630 0.9841 0.9882

This error vector now represents how far each process response is from the ideal behavior. In this example, column 3 is clearly the best. However, in some cases, two adjacent columns will have nearly identical errors. Because minimum delay is also a goal, preferably the first column that minimizes this error is selected. Thus, the selected column of the pseudo inverse is assigned to $a^+$, which is represented as:

5.4271 −6.6682 2.2428

| 0.0000  | 0.0000 | −0.0000 | 0.0000  | 0.0000  | 0.0000 | 0.0000  | 0.0000  | 0.0000  | 0.0000  | 0.0000  | 0.0000  |
|---------|--------|---------|---------|---------|--------|---------|---------|---------|---------|---------|---------|
| 0.0000  | 0.0000 | 0.0000  | 0.0000  | 0.0000  | 0.0000 | 0.0000  | 0.0000  | 0.0000  | 0.0000  | 0.0000  | 0.0000  |
| −0.0001 | 0.0000 | 0.9959  | 0.0006  | 0.0012  | 0.0012 | 0.0010  | 0.0007  | 0.0005  | 0.0002  | −0.0459 | 0.0448  |
| 0.0000  | 0.0000 | 0.0006  | 0.8258  | 0.2972  | 0.0245 | −0.0926 | −0.1240 | −0.1142 | −0.0891 | −0.0626 | −0.0781 |
| 0.0000  | 0.0000 | 0.0012  | 0.2972  | 0.3086  | 0.2566 | 0.1881  | 0.1253  | 0.0764  | 0.0422  | 0.0202  | −0.0061 |
| 0.0000  | 0.0000 | 0.0012  | 0.0245  | 0.2566  | 0.3054 | 0.2695  | 0.2052  | 0.1410  | 0.0886  | 0.0507  | 0.0247  |
| 0.0000  | 0.0000 | 0.0010  | −0.0926 | 0.1881  | 0.2695 | 0.2536  | 0.2005  | 0.1418  | 0.0916  | 0.0540  | 0.0329  |
| 0.0000  | 0.0000 | 0.0007  | −0.1240 | 0.1253  | 0.2052 | 0.2005  | 0.1618  | 0.1162  | 0.0760  | 0.0454  | 0.0303  |
| 0.0000  | 0.0000 | 0.0005  | −0.1142 | 0.0764  | 0.1410 | 0.1418  | 0.1162  | 0.0842  | 0.0556  | 0.0336  | 0.0236  |
| 0.0000  | 0.0000 | 0.0002  | −0.0891 | 0.0422  | 0.0886 | 0.0916  | 0.0760  | 0.0556  | 0.0370  | 0.0225  | 0.0165  |
| 0.0000  | 0.0000 | −0.0459 | −0.0626 | 0.0202  | 0.0507 | 0.0540  | 0.0454  | 0.0336  | 0.0225  | 0.0159  | 0.0085  |
| 0.0000  | 0.0000 | 0.0448  | −0.0781 | −0.0061 | 0.0247 | 0.0329  | 0.0303  | 0.0236  | 0.0165  | 0.0085  | 0.0118  |

If the original process model had no dead time, the first column of this product would not contain all zeros. However, in this case, the process cannot respond immediately, Thus, to make a one unit step change in the process output, make a sequence of three step changes in the process input whose values are given by the vector computed above.

The process response will be a nearly perfect step change with an unavoidable two sample lag. Any desired change can be made by applying a ratio of this vector.

Process Constraints

Another practical problem to be dealt with is that in real-world applications, there are always limitations on valid settings for the process inputs. Since the controller 1 produces a set of desired changes rather than specific values, it can be classified as a velocity controller. The advantage of using the velocity form is that it can deal with the presence of constraints more easily and avoid problems similar to reset windup that cause other MPC controllers to become unstable. The method of dealing with constraints is to filter the controller's outputs prior to applying them to the process input. This filter (i.e., clipper 29 of FIG. 1) is designed to clip the changes to restrict the process input to acceptable levels. The clipping must be performed in such a way as to preserve both the impulse and the ultimate change desired. The following example, illustrated in FIGS. 4A–4C, shows what must be done.

In this example, the process model and pseudo inverse are the same as in the previous one. The process output is currently at steady state with a value of 2.0, and the operator has just made a set point change to 2.5. Furthermore, the process input is limited to a range from 0 to 4.0. First, compute the unconstrained desired process input changes from the pseudo inverse vector and the expected future process error. Because the process is at steady state, the future expected error is −0.5. Therefore, the desired process input changes are computed by multiplying the pseudo inverse vector by 0.5. The desired changes are: 2.7136 −3.3341 1.1214.

Figure 4A:
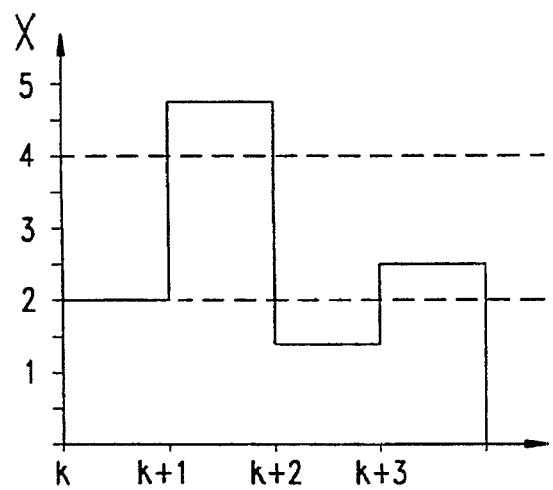
FIGS. 4A–4C are graphs of process input versus sampling interval illustrating the controller's clipping procedure.
Figure 4B:
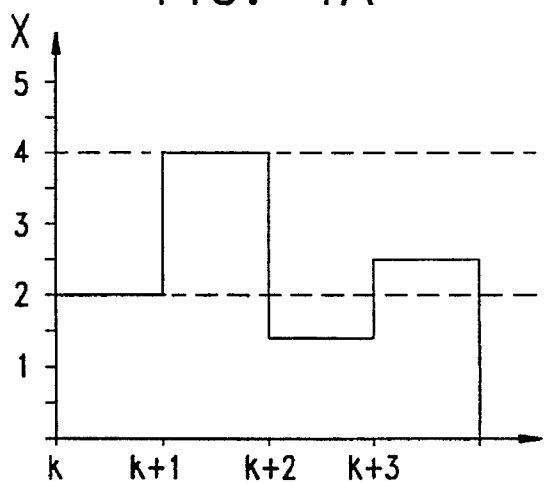
Figure 4C:
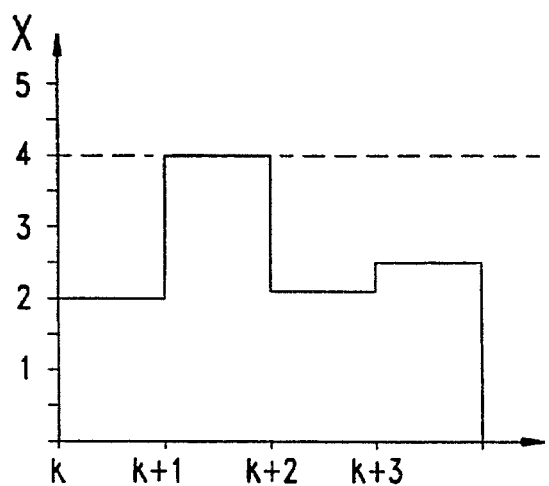

The graph in FIG. 4A shows how these changes alter the process input. The first change required would take the process input from 2.0 to 4.7136, but this is out of range. Therefore, stop at 4.0. Now, adjust the desired change vector so that it will not take the process out of range. It is not sufficient to merely subtract 0.7136 from the first element of the vector, because that would alter the total, and therefore the steady state impact of this set of changes. Therefore, 0.7136 should be added to the second element so that the total is unchanged. The process input changes are now 2.0000 −2.6205 1.1214 and their effect on the process input is shown in FIG. 4B.

This is better, but can be further improved. The purpose of jogging the process input up and down is to impart an impulse to the process to accelerate it's movement in the desired direction. The three step adjustment has both positive and negative impulses and then a final steady adjustment. By clipping the first two changes, the positive impulse is reduced but the negative impulse is unchanged. Left this way, the process response will be much slower than desired. To fix this problem, reduce the negative impulse by the same amount previously subtracted from the positive one. That is, add 0.7136 again to the second element, and subtract 0.7136 from the third. The final desired change vector is now: 2.000 −1.9069 0.4078.

This clipping algorithm is simple to apply, effective, and robust. When it postpones making changes, the net effect of the control changes is delayed slightly, but the steady state impact will remain the same. Therefore, on the next update cycle, any new changes required will only be the result of modeling error, a new set point change, or a process disturbance. On each cycle, the changes that were requested (i.e., $x_{k+1}$) of the controller but not yet made are saved and used to estimate the future steady state process output.

Simplifying and Reducing Computation Requirements

To speed controller computation certain simplifications can be made. At runtime, the model $A^0$ is used exclusively to predict the total expected change that has not yet occurred. Instead of multiplying by $A^0$ and then summing the resulting output vector, the columns of $A^0$ are summed to obtain a vector s so that multiplication of the vector of prior changes $x^0$ by s produces this sum directly.

Another substantial simplification is to limit m (the length of the vector x of changes needed to correct for predicted future error) to a small number. For the special case of m=1, each element of the pseudo inverse of A is simply the inverse of the sum of a (the steady state process gain, $S_1$). In this case, the controller makes simple single step changes that minimize manipulation of process input. A controller with m=1 will respond to a set point change by making a single step change and then waiting for the process to respond. Closed loop dynamics will therefore be identical to open loop dynamics. In most cases, this is not optimum. Setting m=2 allows the controller to make a set of two changes, calculated to drive the process more rapidly in the desired direction, but still without overshoot. For any process with at most first order lag and dead time, the controller with m=2 is capable of accomplishing step-like response from the process output. It is important to recognize that the true process response is not as simple as it may appear from the samples of process output. Perfect control only looks "perfect" from the samples taken. By selecting a shorter update cycle, finer resolution of process dynamics are observable. Likewise, with a shorter update cycle, a controller is able to make sharper corrections.

For a process with second order dynamics, a controller created with m=3 is sufficient to achieve step-like process response. This principle can be extended to higher order dynamics, setting m=(order of the dynamics)+1 however, in practice, setting m=3 is sufficient to provide adequate performance in almost all applications. The SVD method of computing the pseudo inverse of the process is extremely robust. In the presence of noise or a less than perfect model, the pseudo inverse computed by SVD can always be calculated and tends to become more conservative. With m=3, processes with first order dynamics will typically result in a pseudo-inverse where the third row of $A^+$ contains a near zero value. When the process exhibits complex higher order dynamics, a pseudo inverse that assumes at most second order dynamics will still produce excellent response because the pseudo inverse minimizes error in the solution.

A practical limit for the length of the impulse response vector of the model is about 20 elements. If the model window is not wide enough to allow the process to achieve steady state, then control response to a set point change will fail to completely eliminate residual error until more than 20 control updates have occurred. For almost all applications, the best method to correct this problem is to increase the period of the update cycle until a 20 element model captures the complete dynamic behavior of the process.

Tuning to Meet the Process Objective

A further refinement of the controller is to introduce two new tuning parameters that the operator can adjust to make the controller meet his control objectives. These two parameters are the dampening parameter $P_1$ and the partitioning parameter $P_2$. In some applications, a closed loop response of the process that is equivalent to it's open loop response is desired. Faster response may have no economic benefit, whereas the extra output changes required will create more wear and tear on actuators. In this case, a controller with m=1 will suffice. In other cases, some compromise between speed and wear is required. Because the controller output vector for m=1 can be calculated without invoking the heavy machinery of SVD, it is simple to compute a controller output vector using a fraction of the m=1 and m=3 vectors. The partitioning parameter $P_2$ determines what percentage of the m=3 controller output vector to use. A setting of $P_1$=100% always produces the sharpest process response, and $P_2$=0% produces the simplest controller output. Moreover, it may be understood that the $P_2$ parameter may be used to partition the controller output vector among different values of m and is not strictly limited to a single partition.

In cases where the process response is slightly non-linear or the tuning procedure has failed to match the process dynamics to a model precisely, the controller can produce less than optimum results. In cases where process noise is substantial, a slower control response will further reduce wear on process actuators. An effective way of retarding controller response is to correct for only a percentage of predicted error on each update cycle. This percentage is represented by the dampening parameter $P_1$ and can also be changed on demand. $P_1$ can be set from 0 to 150%. While $P_1$=100% gives optimum response to a set point change and guarantees stable performance, a process load change can be corrected faster by overcorrecting for errors. As long as the overcorrection is less than 150%, a stable control response will still be maintained in most cases. For processes requiring very rapid response to load changes, a setting of $P_1$=150% may give more nearly optimum response.

$P_1$ and $P_2$ can be used together to correct for modeling error and noise. Robust control performance means that in the presence of non-linear process behavior and modeling error introduced by changes in the process dynamics, the controller maintains stable control. Reducing settings of either $P_1$ or $P_2$ will improve robustness of the controller.

Controller Performance

The controller of the present invention has been compared with that of optimally tuned PID control algorithms in simulations of a wide variety of process dynamics. The results of these tests are shown in the following FIGS. 5A–5E. In each case, the PID controller was tuned by calculating tuning constants using formulas that minimize the ITAE for set point changes. No adjustments were required in the controller model or the parameters of the calculated pseudo-inverse to optimize its response.

Figure 5A:
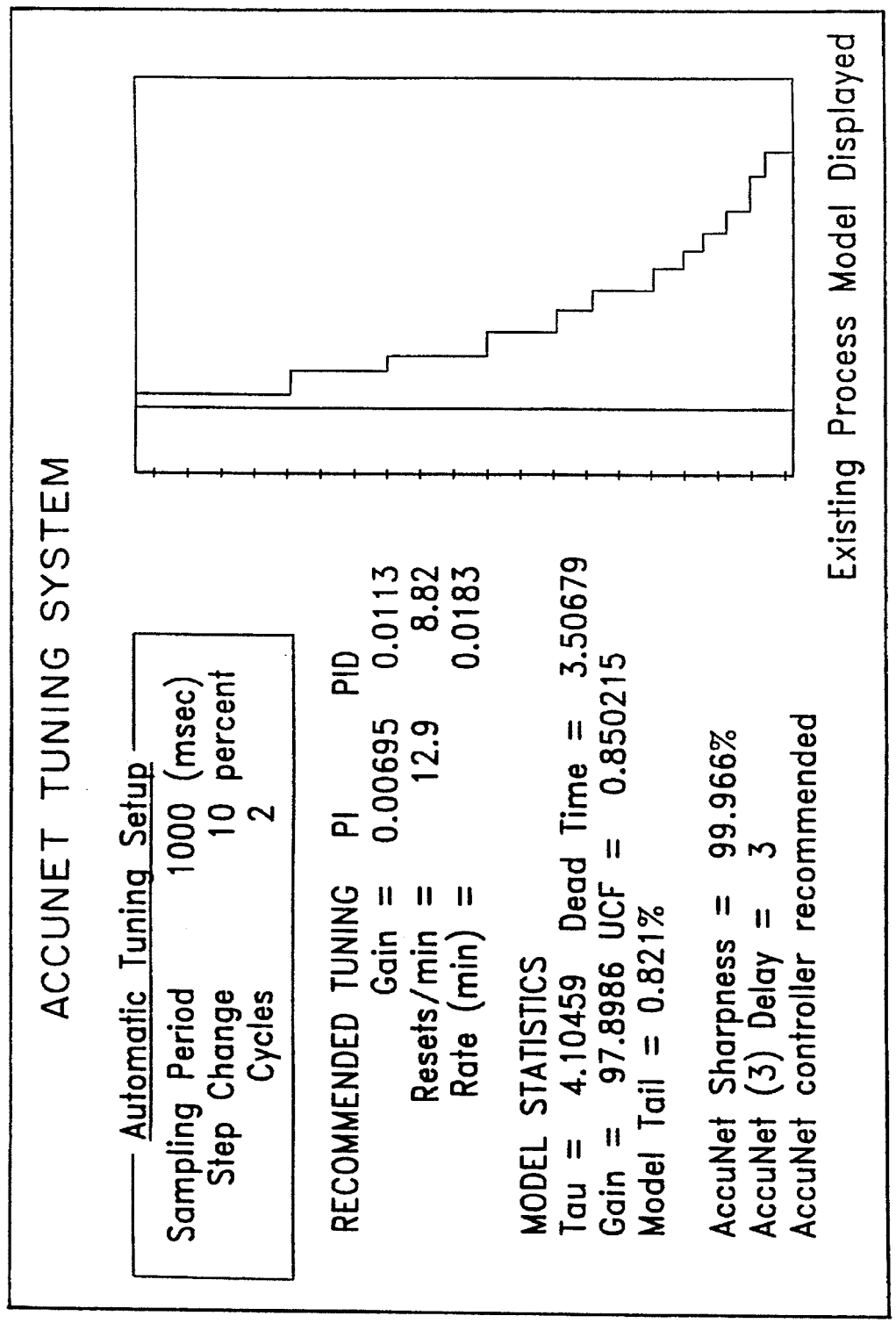
FIGS. 5A–5E are screen displays depicting performance of the controller of the present invention compared with that of optimally tuned PID controllers.

In FIG. 5A, a process simulation provides first order lag of 4 seconds and a dead time of 3. The figure shows a graphical display of the process model and the user interface to the controller's auto-tuning program.

Figure 5B:
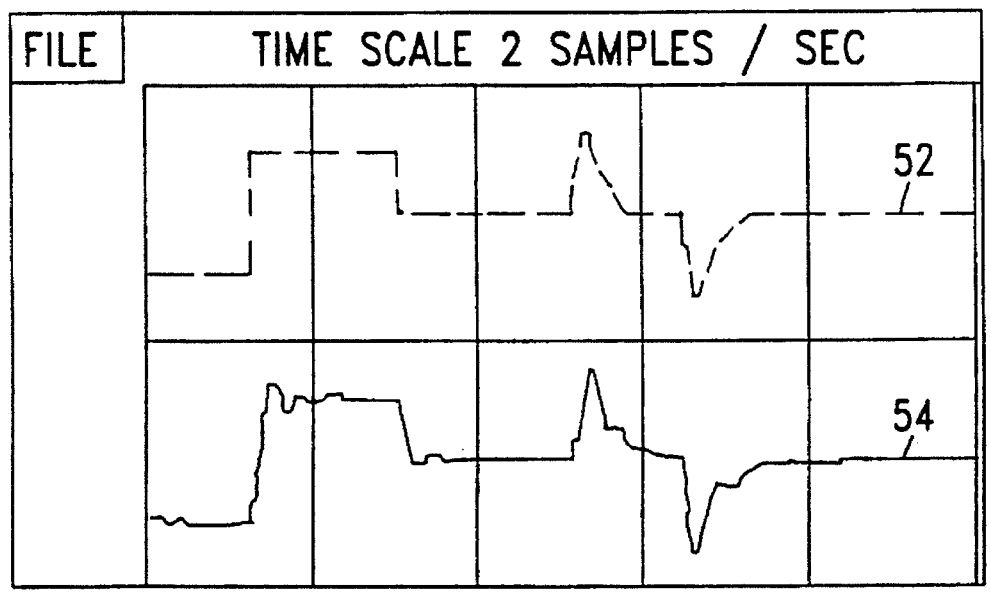

In FIG. 5B, a screen from a process control system captures the response of two identical processes, one controlled by an optimally tuned PID algorithm, the other by the present controller. The first two disturbances are set point changes and the second three are load changes.

The present controller response 52 is displayed on the upper half of the chart while the PID response 54 is shown on the lower half. The present controller responds to both set point and load changes much faster than the PID controller. The response to a setpoint change is very close to being a single step change. The response to process load changes is not so dramatically different, but stabilizes much faster.

Figure 5C:
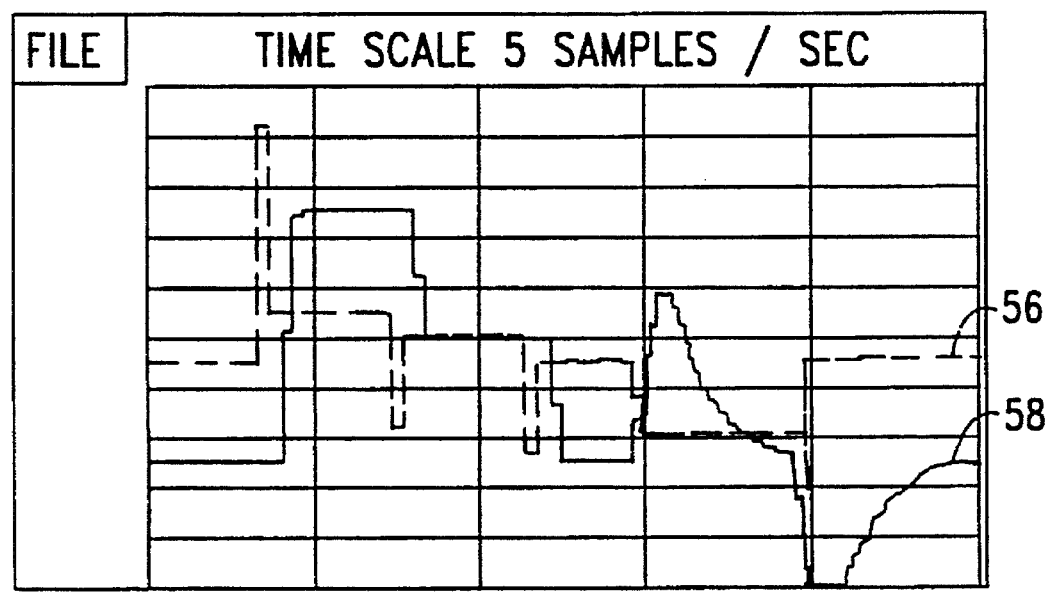

The present controller achieves this high performance in a very different manner than PID control. FIG. 5C displays both the present controller output 56 and the process response 58 during a similar sequence of the same simulation. Note that the in response to a set point change, the present controller makes several step changes before any change in the process has yet occurred. Then it patiently waits for the process to respond.

Figure 5D:
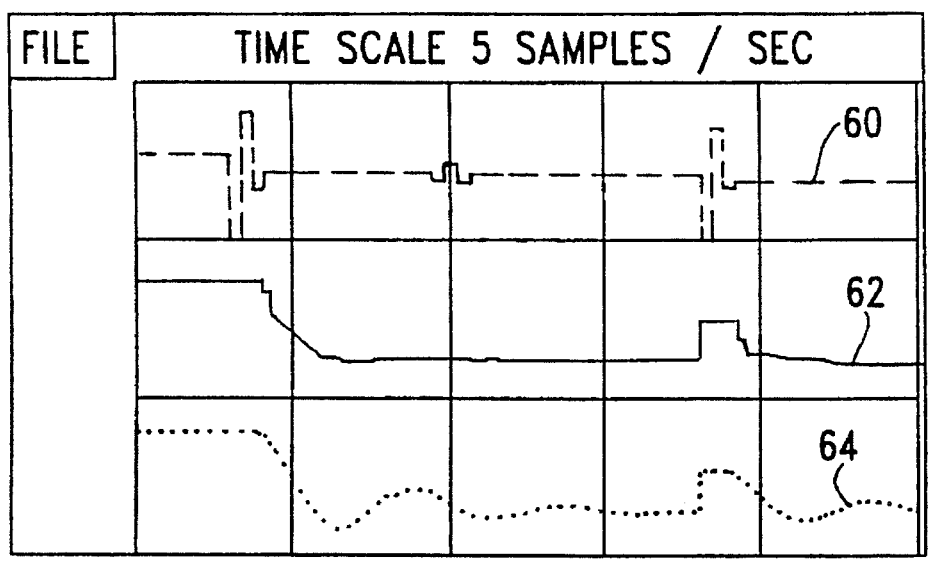

More realistic simulation can be achieved using a second order process model that is somewhat under damped in addition to a lag. Here, the process is modeled by a 4 second delay, followed by a second order lag with tau=5 and damping=0.7. This process is springy, and very hard to control. FIG. 5D shows how the present controller is able to maintain sharp response 62 to set point and load changes without overshoot. However, the PID controller, even though well tuned, has difficulty stabilizing the process as shown by PID output 64.

Figure 5E:
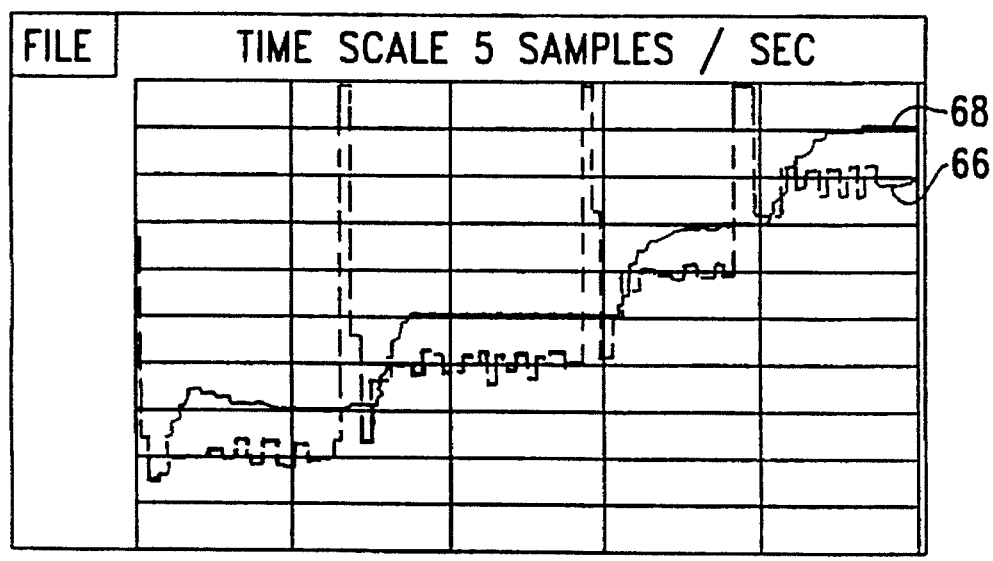

To add further realism, noise is added to the simulation by means of a normally distributed random number generator. FIG. 5E shows the result of making some large set point changes near the range limits of the simulation. In order to reduce the response of the controller to noise, $P_1$ was set to 50% for this test. Note how the clipping algorithm helps to maintain crisp response 68 of the process in the presence of output constraints by increasing the length of time spent at maximum output.

When the present controller is tuned using the noisy signal, the model contains some error. In this case, the SVD pseudo-inverse method proves to be very robust because the resulting controller still produces stable and superior performance.

The present controller has very low computational overhead. A test was performed on code compiled by a Watcom C compiler version 9, with all optimization turned on, including code generation options for 80486/80487 CPU. The tests were performed using a microcomputer with an Intel 80486, running at 33 Mhz. On this computer, the present controller required 64 microseconds per update while a discrete PID controller required about 10 microseconds on the same computer.

In a typical application in a multi-tasking system, where control loops are updated on average once every 2 seconds, if 500 control loops of the present invention were enabled, control computations would consume only 1.6% of CPU time available on this type of machine. When using a microcomputer equipped with an Intel Pentium processor running at 60 mHz, the code executed in less than 15 microseconds per update. The parallel processing and excellent floating point processing capabilities of this chip are well suited to vector calculations. The total time required to update a control loop must also include the time for data acquisition and updating of the controller output. Using a high speed parallel process interface in combination with the Pentium processor, this total time is about 80 microseconds per loop. The time required to access the I/O hardware becomes the limiting step. In high speed applications, the controller can be used to perform control requiring 1 millisecond control cycles of multiple loops simultaneously using low cost microcomputer hardware.

For tuning, the computation of the pseudo-inverse using an SVD algorithm is the most computationally intensive step. For these purposes, the matrix to be inverted is 22×3, and this computation requires less than one second of CPU time on all 486-based systems tested. When used for adaptive control, the tuning program can execute at lower priority than the control program and would not interfere with the performance of a high speed control application.

PID Tuning

To further assist the engineer in configuring process control applications, the model of the present invention may be used to compute optimum tuning constants for discrete PID controllers. The tangent and point or two point methods may be used to estimate first order lag and dead time to be used to compute settings of gain, integral time, and derivative time that will optimize a given performance measure. Rovira(1981) gives formulas for tuning constants that give minimum integral time weighted average error for either PI or PID controllers. Computing optimum constants for PI and PID control from the model adds convenience in many applications, because often adequate control can be accomplished using PI and PID control, and the extra computational load required for the presently described architecture is not justified. These control techniques may be implemented so that the controller can switch from one technique to another while in automatic so that performance of control under the present invention, PI, and PID types of control may be compared.

Feed Forward Control

As described, the controller of the present invention is a SISO (single input single output) controller. However, the same techniques may be extended to MIMO (multiple input multiple output) control. The first step in this development is MISO (multiple input single output), where one input (process output) is compared with a set point, and other process signals are used to anticipate load changes in the process. The dynamic relationship between these other signals and the target signal can be represented by the impulse models. These models can be applied using matrix multiplication to further adjust the model predictions and thus introduce automatic compensation. Again, methods of linear algebra can be used to calculate the ideal compensation for any expected disturbance designed to minimize that disturbance. This type of control is similar to feed-forward control with feedback trim, a popular control technique utilizing existing control methods. The advantage of the present approach is that feed-forward gain is found automatically and the signal is automatically adjusted to compensate for delay and lag.

Adaptive Control

The model of the present invention may be changed on the fly without introducing disturbance in the controller response. The controller only retains knowledge about prior output changes and changes desired from the past calculations, but does not retain predictions of future process conditions. The prediction is made on the basis of the current process variable sample only, and is made fresh on each cycle by a single vector multiplication. This capability, in combination with obtaining new data for a process model while in closed loop mode gives rise to the unique potential for adaptive control. Adaptive control must be applied carefully, however, because we do not want to have load changes in the process attributed to changes in the controller output. One solution to this problem is that samples for improving an existing process model can be taken every time that a set point change is performed. The new process modeling information may either replace the old, or be averaged with it to obtain a new model. A new pseudo-inverse and model sum must be computed in order to retune the controller. An adaptive algorithm can perform all of these steps without operator intervention using the statistical measures of the model and it's fit to the data as inputs to decisions for whether or not retuning is needed. This adaptive tuning procedure may be used to update PI and PID constants also if desired.

Applications

While there are numerous potential applications for process control by means of the present invention, some specific examples include simple control of fluid flow, control of a chemical reactor, and control of a mechanical positioner in a disk drive.

Control of fluid flow can be accomplished by the use of a flow measuring transducer, a flow control valve, an analog-to-digital converter, a digital-to-analog converter, and an arithmetic processor unit that is programmed to perform the control method of the present invention. The flow measuring transducer measures flow and produces an electrical signal proportional to this flow. This signal is translated into a digital word by the analog-to-digital converter whose output is a binary signal whose value is now proportional to the flow over a limited range and having a precision limited by the number of bits in the digital word.

The arithmetic processor periodically loads the binary flow signal and calculates a value of the control valve that will bring the flow rate to a desired set point. The set point is entered into the arithmetic processor by any input-output device desired, for example a CRT terminal and keyboard. The settings of $P_1$ and $P_2$ are similarly entered into the memory of the arithmetic processor. The model coefficients and the pseudo-inverse required by the controller may be stored in random access memory or read-only memory of the arithmetic processor. These values are computed using the method described herein by the same or a different arithmetic processing unit.

Each time the arithmetic processor executes a control cycle, it computes one value that is proportional to the desired position of the flow control valve. This digital value is transmitted to the digital-to-analog converter which translates the value into an analog signal sent to the automatic control valve. Alternately, an automatic control valve that accepts a digital signal directly and positions the valve proportionately to the value of this signal may be employed.

The benefit of using the present method in this application is that the flow rate controlled by this method can more rapidly respond to changes in set point or changes in an unmeasured load (for example changes in pressure across the valve) than a conventional PID controller. The present controller is better able to compensate for the delay inherent in the action of the actuator, signal transmission delays, and lag of response to the valve position caused by the momentum of the flowing fluid.

In addition, multiple flow control systems can employ a single arithmetic processor unit because the present controller is simple and rapidly executed. For example, using a microcomputer having an Intel Pentium processor operating at a clock speed of 60 megahertz, the present control method was found to require approximately 15.0 microseconds. The total time required to acquire data, execute the control method, and transmit data to the valve was found to require about 80 microseconds. When one microcomputer is used to control 1000 separate flows, once per second, the processor performs control calculations only about 8% of the time. When using a multi-tasking operating system, the remaining time could be used for other activities, such as display of values for an operator, data logging, or control and monitoring of other devices.

Control of a chemical reactor is similar to control of fluid flow except that the process output may be a measurement of any physical or chemical property that is related to the quality of the product produced. For example, if the reactor is a polymerization reactor, the viscosity of the product may be a desired measure of the quality of the product. Other appropriate measures might be pH, specific gravity, conductivity, or analysis of a chemical species measured by titration, spectroscopic, chromatographic, or other analytical methods. This quality measure is similarly translated into a digital signal that is processed in an arithmetic processor using the method of the present invention to compute a value proportional to the desired setting of a process input. The process input can be the flow of a chemical reactant or catalyst, the flow of heating or cooling fluid, or the flow of electrical current to a resistance heating means, or any other input that has an effect on the product quality measure of interest. The value computed by the present method may also be used as the set point of a flow control for an appropriate process input, and it is particularly advantageous when this flow control is also performed using the same arithmetic processor, particularly when the processor employs the present inventive method.

The present control method used for control of a chemical reaction is particularly advantageous when the residence time of chemical in the process is long compared with the desired period of process control. For example, a plug flow polymerization reactor having a residence time of one minute where viscosity is measured once every 10 seconds. If flow of a polymerization catalyst is used as the process input, a change in the flow rate of this catalyst will not have a measurable affect on the viscosity for about 60 seconds. This large signal lag is difficult to handle using conventional PID control methods, however the present control method can handle this lag. For example, if the operator makes a set point change in the desired viscosity, the present controller will make an immediate change in the catalyst level, based on its model, required to change the viscosity by the desired amount. Once this change has been applied, further control action by the present controller will be delayed for 60 seconds because the model will compensate for the deadtime of the process.

In a device used to read rotating optical or magnetic media, a read-write head must be positioned at a particular position (a track) on the media before data can be read or written. The time required to move the head to this position is typically the time-limiting step in operation of a data storage and retrieval device handling a large quantity of data. Movement of the head may be performed using an electromagnetic device, such as a voice-coil or servo-motor. In each case, the movement of the head is controlled by an electrical signal. A means must exist for the drive to determine the precise position of the head. This measurement may be either a digital or analog electrical signal. The control method used to position the head must move the head as rapidly as possible towards the desired position and stabilize the measurement to within a predetermine tolerance before data can be transferred to or from the media. The time required to stabilize the head is known as the settling time.

In this application, the present control method is particularly advantageous. If the electromechanical actuator is a voice-coil type, it consists of an electromagnet and a spring positioned such that the head moves to an equilibrium position that is proportional to the current passed through the electromagnet. The mass of the head and positioning arm causes this type of mechanical system to oscillate, therefore a mechanical dampener device is also required. The dynamics of the head positioner can be described using a second order linear differential equation. Using a conventional PID controller for feedback control of the head positioner, the settling time is long relative to the time required for the head to first cross the desired new position. Unlike a PID method, the present feedback control method can compensate for the second order dynamics of the head positioner and thus prevent oscillation in closed loop mode. The ability of the present control method to dampen oscillation can reduce the settling time by at least 50%.

To further reduce settling time of a head positioning system, the voice-coil actuator can be designed so that the span of movement of the actuator extends beyond the minimum and maximum tracks on the media. The present control method will then produce momentary signals that would eventually hyperextend the head in order to move the head more rapidly in a desired direction. For example, if the current applied to the positioner is normally in the range of 0 to 100 mA, equilibrium positions over the media corresponding to currents of 25 and 75 mA would span the media while mechanical stops prevent actual movement beyond the first and last tracks.

The sampling and update rate for the present control method when controlling a disk drive head positioner must be very rapid, typically less than 1 millisecond. The simplicity of this control method compared with other model predictive control methods will allow this control to be accomplished using inexpensive general purpose microprocessors.

To summarize, in accordance with the present invention, the basic steps performed by the controller on each update are the following. Acquire Y from the process. Determine the future process changes. Compute the steady state error. Compute the correction required. Apply the clipping algorithm. Add the first change element to the existing controller output and send the updated value to the process. Shift the elements of $x^o$ to the right and replace the first element with the change just made. Shift the changes not yet made to the left one element.

The elements of $a^+$ and s are constants set automatically by the calibration process. This calibration process uses the matrix algebra methods discussed previously in the following sequence. Sample process inputs and outputs during a window preferably at least $2n+3$ samples long in which there are changes made to the process input. Perform multiple linear regression to determine impulse response model. Set up $n+2$ by 3 matrix from impulse response model and compute pseudo inverse. Find best column of the pseudo inverse and assign to $a^+$. Compute predictor sum vector s from impulse model a. The first element of vector s is equal to the process gain.

The tuning task is normally performed by a separate program in a multi-tasking environment. This task can operate continuously to achieve adaptive control. The tuning constants of $P_1$, $P_2$, and the pseudo-inverse, and the constants of the model can all be changed on-the-fly without introducing disturbance in the process.

To achieve optimum performance, it is important that the control system is capable of synchronizing the timing of process sampling and updating of controller outputs. On some systems used for process control, data acquisition hardware scans inputs from multiple points asynchronously from the controller cycle. In this case, the delay introduced by the data acquisition hardware is not constant and cannot be reliably modeled. When process noise is present, digital filtering may be introduced in combination with sampling rates that are an integer multiples of the controller updates. Digital filtering should be performed so that the time constant of the filter is equal or less than the update cycle of the controller. When longer filtering is performed, the filter adds to the process lag and the controller will attempt to compensate for this lag by making more severe changes. The net effect is that the filter's attempt to reduce sensitivity to noise is thwarted by the controller.

In this disclosure, there is shown and described the preferred embodiments of the invention, it being understood that the invention is capable of use in various other combinations and environments and is capable of changes or modifications within the scope of the inventive concepts as expressed herein.

I claim:

1. An electronic model predictive control apparatus for controlling a plant having a plant input signal and a plant output signal dependent on said plant input signal, comprising:
   a first memory containing a vector of data elements derived from a pseudo-inverse of an impulse response matrix model of said plant;
   a second memory containing data indicative of future plant input signal changes calculated during prior control cycles;
   a third memory containing a vector of past plant input signal changes;
   a fourth memory containing data elements by way of which a future plant output signal change due to past plant input signal changes may be derived from said vector of past plant input signal changes;
   an electronic processor adapted to:
      receive a plant output signal sample;
      calculate an expected future plant output signal from said data indicative of future plant input signal changes calculated during prior control cycles, said plant's steady-state gain, said future plant output signal change due to past plant input signal changes, and said plant output signal sample;
      calculate an error signal from a setpoint signal and said expected future plant output signal; and
      calculate a plant input signal change from said error signal, said vector of data elements derived from said pseudo-inverse, and said data indicative of future plant input signal changes calculated during prior control cycles;
   where said plant input signal change is applied to said plant input signal for controlling said plant output signal.

2. The control apparatus of claim 1, wherein said first, second, third and fourth electronic memories are embodied in a single memory device.

3. The control apparatus of claim 2, wherein said memory device is a RAM.

4. The control apparatus of claim 1, wherein said processor is under program control.

5. The control apparatus of claim 1, wherein said processor is implemented by direct electrical connection.

6. The control apparatus of claim 1, wherein said plant input signal change is further processed prior to being applied to said plant input signal in order to clip said plant input signal change to restrict said plant input signal to a threshold level, where said further processing includes:
   determining when said plant input signal added to said plant input signal change exceeds said threshold level and computing a clip value equal to an amount by which said threshold level is exceeded;
   subtracting said clip value from said plant input signal change;
   adding twice said clip value to a plant input signal change calculated for the next control cycle;
   subtracting said clip value from a plant input signal change calculated for two control cycles in the future.

7. The control apparatus of claim 1, wherein said plant input signal change is further processed prior to being applied to said plant input signal in order to clip said plant input signal change to restrict said plant input signal to a threshold level, where said further processing includes:
   determining when said plant input signal added to said plant input signal change exceeds said threshold level; and modifying the calculated plant input signals over a plurality of control cycles so that the sum of said modifications equals zero.

8. The control apparatus of claim 1, wherein said error signal is multiplied by a dampening factor.

9. The control apparatus of claim 1, wherein a partitioning factor is used to apportion the contribution to said plant input signal change due to said vector of data elements derived from said pseudo-inverse and at least one other vector derived from said pseudo-inverse.

10. The control apparatus of claim 9, wherein said at least one other vector derived from said pseudo-inverse is a single element vector comprising the inverse of said plant's steady-state gain.

11. The control apparatus of claim 1, wherein said vector of data elements derived from said pseudo-inverse is a vector comprising the elements of an optimal column of said pseudo-inverse.

12. The control apparatus of claim 11, wherein said optimal column of said pseudo-inverse is at least partially determined by multiplying said impulse response matrix model by said pseudo-inverse, subtracting an identity matrix, and computing the least squares error.

13. The control apparatus of claim 12, wherein said optimal column of said pseudo-inverse is further determined by selecting the best left-most column in order to provide an early plant output signal response.

14. The control apparatus of claim 1, wherein said vector of data elements derived from said pseudo-inverse is a vector comprising a weighted average of at least two columns of said pseudo-inverse.

15. The control apparatus of claim 1, wherein said vector of data elements derived from said pseudo-inverse is a vector comprising an interpolation between two columns of said pseudo-inverse.

16. The control apparatus of claim 1, wherein said second and third memories comprise shift registers.

17. The control apparatus of claim 1, wherein said data elements contained in said fourth memory comprise a vector where each element corresponds to the sum of an $A^o$ column, where $A^o$ is the integral form of said impulse response matrix.

18. The control apparatus of claim 1, wherein said data elements contained in said fourth memory comprise a matrix where elements correspond to elements in a $A^o$ matrix, where $A^o$ is the integral form of said impulse response matrix.

19. The control apparatus of claim 1, wherein said plant comprises a fluid flow system having a flow measuring transducer and a flow control valve, where said plant output signal is derived from said flow measuring transducer, and said plant input signal is applied to said flow control valve.

20. The control apparatus of claim 1, wherein said plant comprises a chemical reactor system having a quality measure transducer and an actuator having an effect on said quality measure, where said plant output signal is derived from said quality measure transducer, and said plant input signal is applied to said actuator.

21. The control apparatus of claim 1, wherein said plant comprises a chemical reactor system having a flow controller, wherein said plant input signal is applied to a setpoint of said flow controller.

22. The control apparatus of claim 1, wherein said plant comprises a storage device having a read and/or write head, a head actuator, and rotating storage media, where said plant output signal is related to the position of said head over said storage media, and said plant input signal is applied to said head actuator to control the position of said head over said storage media.

23. The control apparatus of claim 1, wherein said vector of data elements derived from said pseudo-inverse has three data elements.

24. The control apparatus of claim 1, wherein said vector of data elements derived from said pseudo-inverse has a number of data elements equal to the order of the dynamics of a model of said plant plus one.

25. The control apparatus of claim 1, wherein said pseudo-inverse is calculated by singular value decomposition.

26. The control apparatus of claim 1, wherein said impulse response matrix is derived from an impulse response vector having about twenty elements.

27. The control apparatus of claim 1, wherein new modeling information is obtained during a setpoint change, and said new modeling information is used for obtaining a new model, thereby implementing adaptive control.

28. The control apparatus of claim 1, further comprising a CRT and keyboard for providing said setpoint signal to said processor.

29. The control apparatus of claim 1, wherein said impulse response matrix is derived from an impulse response vector determined by linear regression.

30. A model predictive control method for controlling a process having a process input signal and a process output signal dependent on said process input signal, comprising the steps of:
sampling said process output signal;
calculating an expected future process output signal from data indicative of future process input signal changes calculated during prior control cycles, said process' steady-state gain, a future process output signal change due to past process input signal changes, and said process output signal sample;
calculating an error signal from a setpoint signal and said expected future process output signal;
calculating a process input signal change from said error signal, a vector of data elements derived from a pseudo-inverse of an impulse response matrix model of said process, and said data indicative of future process input signal changes calculated during prior control cycles; and
applying said process input signal change to said process input signal for controlling said process output signal.

31. The control method of claim 30, wherein said process input signal change is further processed prior to being applied to said process input signal in order to clip said process input signal change to restrict said process input signal to a threshold level; where said further processing includes the steps of:
determining when said process input signal added to said process input signal change exceeds said threshold level and computing a clip value equal to an amount by which said threshold level is exceeded;
subtracting said clip value from said process input signal change;
adding twice said clip value to a process input signal change calculated for the next control cycle;
subtracting said clip value from a process input signal change calculated for two control cycles in the future.

32. The control method of claim 30, wherein said plant input signal change is further processed prior to being applied to said plant input signal in order to clip said plant input signal change to restrict said plant input signal to a threshold level, where said further processing includes:

determining when said plant input signal added to said plant input signal change exceeds said threshold level;
and modifying the calculated plant input signals over a plurality of control cycles so that the sum of said modifications equals zero.

33. The control method of claim 30, further comprising the step of multiplying said error signal by a dampening factor.

34. The control method of claim 30, further comprising the step of apportioning, by way of a partitioning factor, the contribution to said process input signal change due to said vector of data elements derived from said pseudo-inverse and at least one other vector derived from said pseudo-inverse.

35. The control method of claim 34, wherein said at least one other vector derived from said pseudo-inverse is a single element vector comprising the inverse of said process' steady-state gain.

36. The control method of claim 30, wherein said vector of data elements derived from said pseudo-inverse is a vector comprising the elements of an optimal column of said pseudo-inverse.

37. The control method of claim 36, wherein said optimal column of said pseudo-inverse is at least partially determined by multiplying said impulse response matrix model by said pseudo-inverse, subtracting an identity matrix, and computing the least squares error.

38. The control method of claim 37, wherein said optimal column of said pseudo-inverse is further determined by selecting the left-most column having an acceptable least squares error in order to provide an early process output signal response.

39. The control method of claim 30, wherein said vector of data elements derived from said pseudo-inverse is a vector comprising a weighted average of at least two columns of said pseudo-inverse.

40. The control method of claim 30, wherein said vector of data elements derived from said pseudo-inverse is a vector comprising an interpolation between two columns of said pseudo-inverse.

41. The control method of claim 30, further comprising the step of deriving said future process output signal change due to past process input signal changes by multiplying a vector of past process input signal changes by a vector where each element corresponds to the sum of an $A^o$ column, where $A^o$ is the integral form of said impulse response matrix.

42. The control method of claim 30, further comprising the step of deriving said future process output signal change due to past process input signal changes by multiplying a vector of past process input signal changes by a matrix where elements correspond to elements in a $A^o$ matrix, where $A^o$ is the integral form of said impulse response matrix; and summing the resulting vector.

43. The control method of claim 30, wherein said process comprises a fluid flow system having a flow measuring transducer and a flow control valve, further comprising the steps of deriving said process output signal from said flow measuring transducer, and applying said process input signal to said flow control valve.

44. The control method of claim 30, wherein said process comprises a chemical reactor system having a quality measure transducer and an actuator having an effect on said quality measure, further comprising the steps of deriving said process output signal from said quality measure transducer, and applying said process input signal to said actuator.

45. The control method of claim 30, wherein said process comprises a chemical reactor system having a flow controller, wherein said process input signal is applied to a setpoint of said flow controller.

46. The control method of claim 30, wherein said process comprises a data storage access system having a read and/or write head, a head actuator, and rotating storage media, further comprising the steps of deriving said process output signal from the position of said head over said storage media, and applying said process input signal to said head actuator to control said head.

47. The control method of claim 30, further comprising the steps of obtaining new modeling information during a setpoint change, and using said new modeling information for generating a new model, thereby implementing adaptive control.

48. The control method of claim 30, further comprising the step of determining an impulse response vector by linear regression; and deriving said impulse response matrix from said impulse response vector.

49. The control method of claim 30, further comprising the steps of:

determining, according to said impulse response matrix model, optimum tuning constants for PI and/or PID controllers, and storing said constants for selective control of said process by alternate control techniques.

50. A method for controlling the operation of a process having a process input signal and a process output signal dependent upon said process input signal, said method comprising the steps of:

acquiring a sample of said process output signal;

determining a predicted process output signal at a future steady state condition according to a process model and said sample of said process output signal;

determining a steady state error signal according to the difference between said predicted process output signal and a desired setpoint signal;

determining a set of future process input signal changes calculated so that if applied to said process input signal said estimated steady state error would be substantially cancelled by causing at least one approximate step response in said process output signal at a future time; and applying a first member of said set of future process input signal changes to said process input signal for controlling the operation of said process.

51. The method according to claim 50, wherein said step of determining a set of future process input signal changes includes the step of:

scaling a predetermined vector of data elements by said steady state error signal, said data elements representing an optimal column of a pseudo-inverse of a matrix of said process model.

52. The method of claim 51, wherein said set of future process input signal changes, if applied to said process input signal, would cause a single approximate step response in said process output signal at a future time.

53. The method according to claim 50, wherein said step of determining a set of future process input signal changes includes the step of:

scaling a predetermined vector of data elements by said steady state error signal, said data elements representing a weighted average of at least two columns of a pseudo-inverse of a matrix of said process model.

54. The method of claim 53, wherein said set of future process input signal changes, if applied to said process input signal, would cause a single approximate step response in said process output signal at a future time.

55. The method of claim 50, wherein said step of determining a set of future process input signal changes includes the step of:

scaling a predetermined vector of data elements by said steady state error signal, said data elements representing an interpolation between two columns of a pseudo-inverse of a matrix of said process model.

56. The method of claim 55, wherein said set of future process input signal changes, if applied to said process input signal, would cause a single approximate step response in said process output signal at a future time.

57. The method of claim 50, wherein said process is a fluid flow process, where said process input signal controls flow rate and where said process output signal provides an indication of flow rate.

58. The method of claim 50, wherein said process is a chemical reactor process, where said process input signal effects a quality measure, and where said process output signal provides an indication of said quality measure.

59. The method of claim 50, wherein said process is a data access process for a data storage device, where said process output signal is related to the movement of a data head, and where said plant input signal controls the movement of said data head.

60. An electronic model predictive control apparatus for controlling a process having a process input signal and a process output signal dependent on said process input signal, comprising:

electronic memory means for storing a vector of data elements derived from one or more columns of a pseudo-inverse of an impulse response matrix model of said process;

means for receiving a process output signal sample;

electronic processor means for calculating an expected future process output signal, for calculating an error signal from a setpoint signal and said expected future process output signal, and for calculating a process input signal change from said error signal, said vector of data elements derived from one or more columns of said pseudo-inverse, and data indicative of future process input signal changes calculated during prior control cycles; and means for applying said process input signal change to said process input signal for controlling said process output signal.

61. The control apparatus of claim 60, wherein said vector of data elements represents an optimal column of said pseudo-inverse of said impulse response matrix model of said process.

62. The control apparatus of claim 61, wherein said optimal column is selected by determining the column which when used as a set of input signal changes to said process would produce the best approximate step response output according to a predetermined criteria.

63. The control apparatus of claim 62, wherein said criteria includes least squares error.

64. The control apparatus of claim 60, further comprising data entry means for providing said setpoint signal to said processor means.

65. A method for controlling the operation of a process having a plurality of process input signals and one process output signal dependent upon at least one of said process input signals, said method comprising the steps of:

acquiring a sample of said process output signal;

determining a predicted process output signal at a future steady state condition according to a process model and said sample of said output signal;

determining a steady state error signal according to the difference between said predicted process output signal and a desired setpoint signal;

determining, for each process input signal, a set of future process input signal changes calculated so that if applied to said plurality of process input signals said estimated steady state error would be substantially cancelled by causing at least one approximate step response in said process output signal at a future time; and applying a first member from each said set of future process input signal changes to a corresponding one of said process input signals for controlling the operation of said process.

66. The method of claim 65, wherein said set of future process input signal changes for each process input signal, if applied to said plurality of process input signals, would cause a single approximate step response.

67. A method for controlling the operation of a process having a plurality of process input signals and a plurality of process output signals each process output signal dependent upon at least one of said process input signals, said method comprising the steps of:

acquiring a corresponding sample of each of said plurality of process output signals;

determining, for each of said plurality of process output signals, a corresponding predicted process output signal at a future steady state condition according to a process model and said corresponding sample;

determining, for each of said plurality of process output signals, a corresponding steady state error signal according to the difference between said corresponding predicted process output signal and a corresponding setpoint signal;

determining, for each process output signal, a plurality of sets of future process input signal changes, each set corresponding to one of said plurality of process input signals, calculated so that if applied to said plurality of process input signals said corresponding estimated steady state error would be substantially cancelled by causing at least one approximate step response in a corresponding one of said plurality of process output signals at a future time; and applying, to each one of said plurality of process input signals, a sum of first members from corresponding sets of future process input signal changes for controlling the operation of said process.

68. The method of claim 67, wherein said plurality of sets of future process input signal changes, if applied to said plurality of process input signals, would cause a single approximate step response.

69. A model predictive control method for controlling a process having a process input signal and a process output signal dependent on said process input signal, comprising the steps of:

sampling said process output signal;

calculating an expected future process output signal from a future process output signal change due to past process input signal changes and said process output signal sample;

calculating an error signal from a setpoint signal and said expected future process output signal;

calculating a process input signal change from said error signal multiplied by the inverse of said process' steady-state gain, said steady-state process gain determined according to an impulse response model of said process; and applying said process input signal change to said process input signal for controlling said process output signal.

* * * * *